(No Model.) 8 Sheets—Sheet 1.

J. H. KNOWLES.
MACHINE FOR FEEDING SHEETS OF PAPER.

No. 540,814. Patented June 11, 1895.

WITNESSES:

INVENTOR:
John H. Knowles (No Model.) 8 Sheets—Sheet 2.

J. H. KNOWLES.
MACHINE FOR FEEDING SHEETS OF PAPER.

No. 540,814. Patented June 11, 1895.

(No Model.) 8 Sheets—Sheet 5.

J. H. KNOWLES.
MACHINE FOR FEEDING SHEETS OF PAPER.

No. 540,814. Patented June 11, 1895.

WITNESSES:

INVENTOR:
John H. Knowles
By his atty

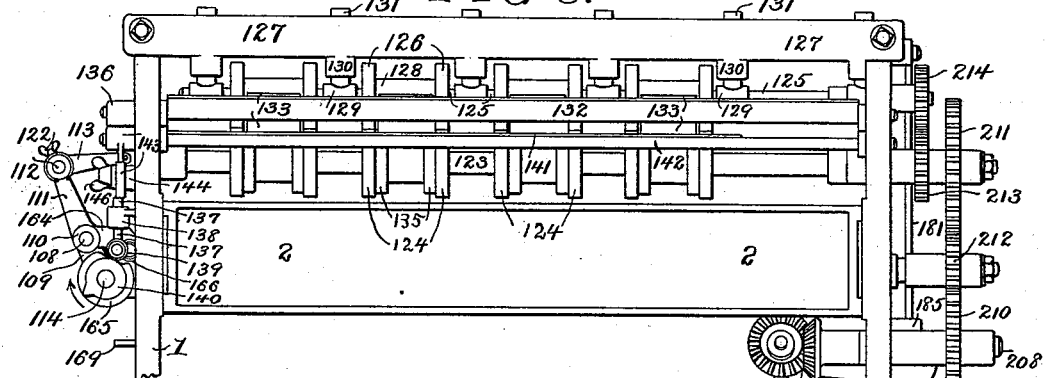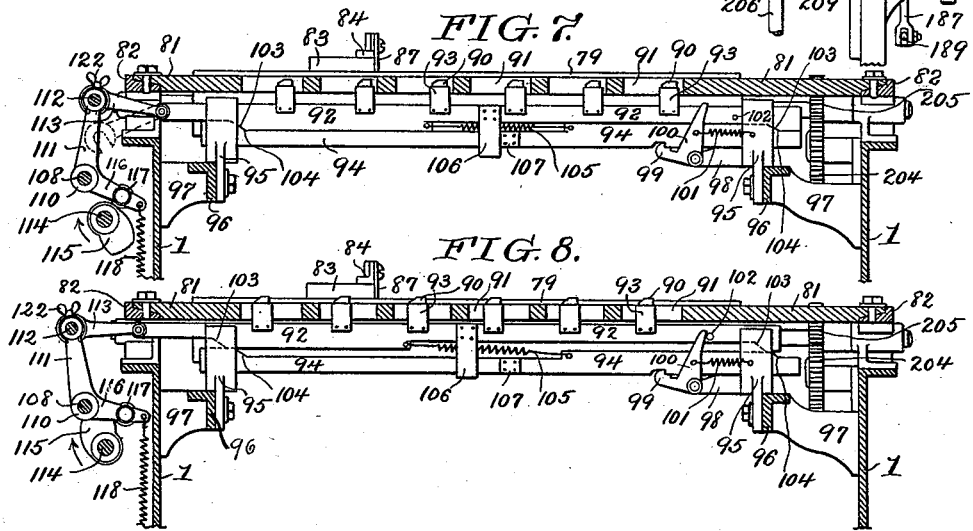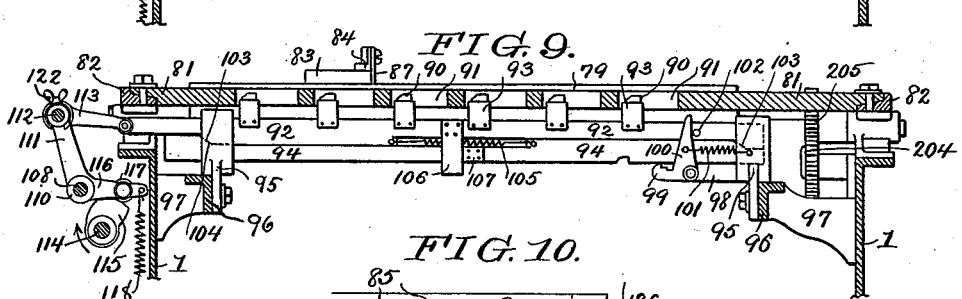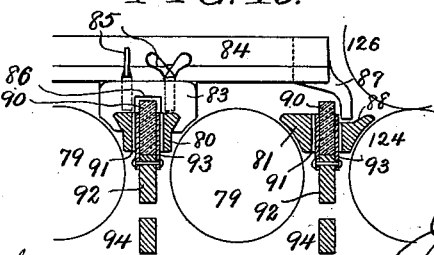

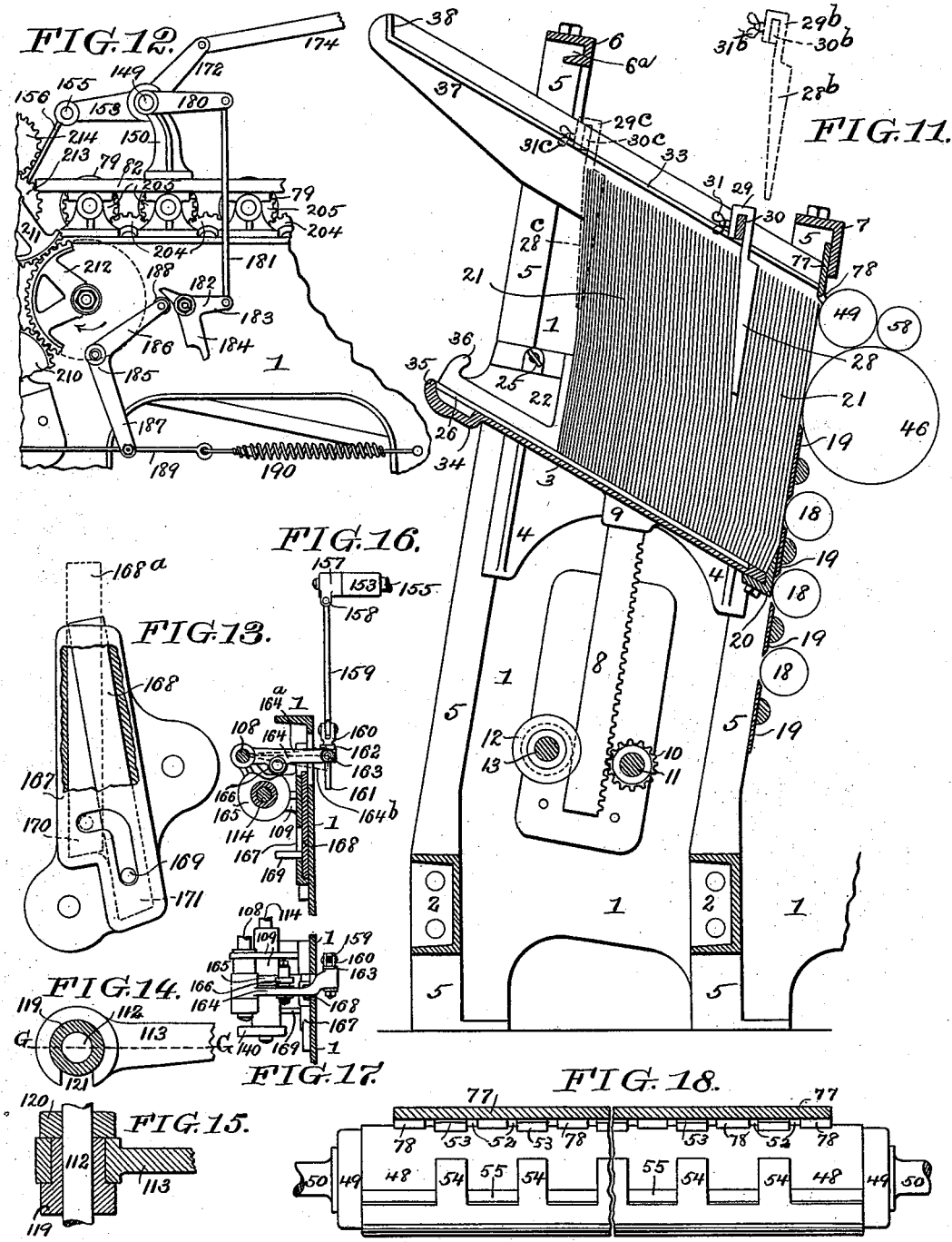

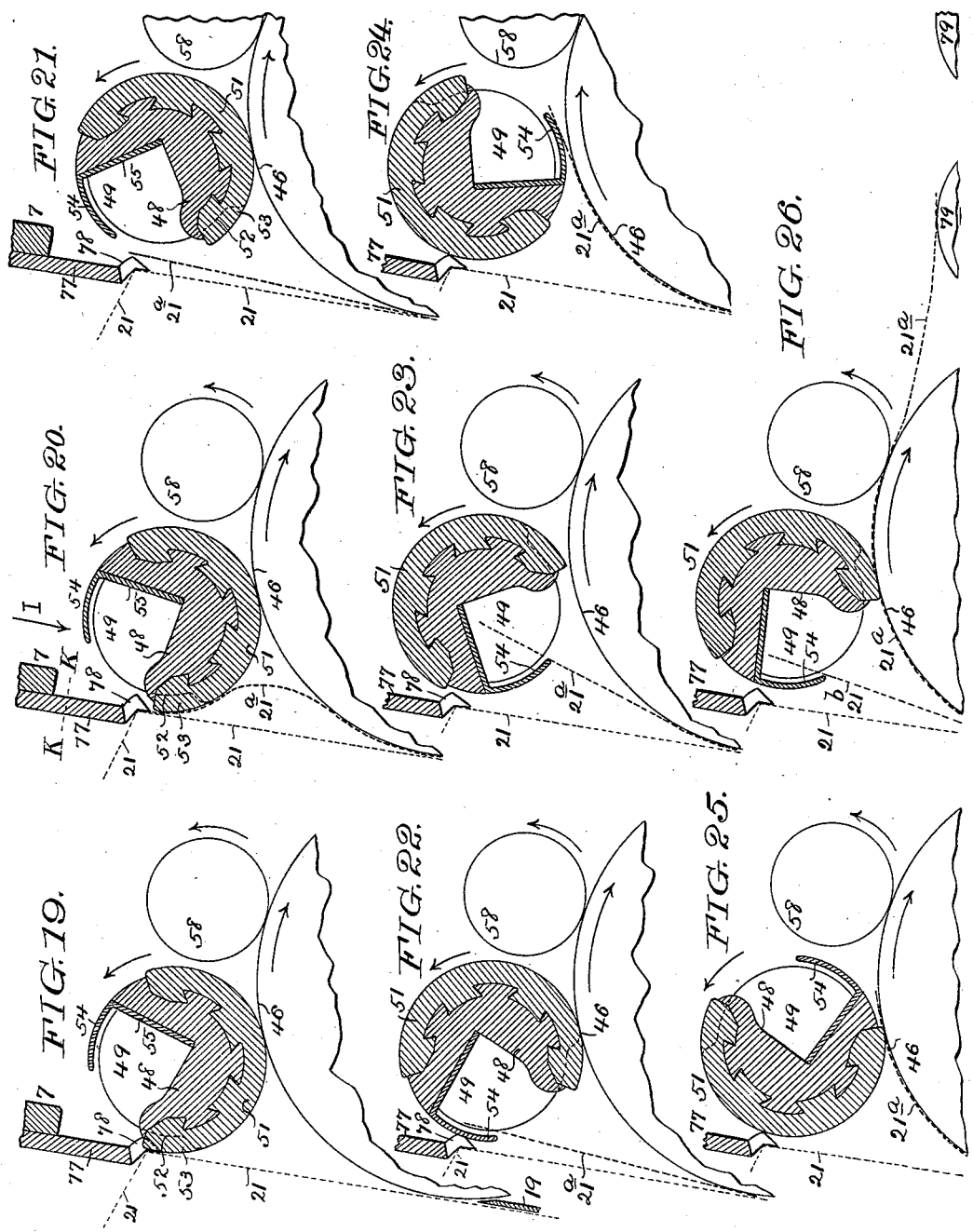

UNITED STATES PATENT OFFICE.

JOHN HENRY KNOWLES, OF PHILADELPHIA, PENNSYLVANIA.

MACHINE FOR FEEDING SHEETS OF PAPER.

SPECIFICATION forming part of Letters Patent No. 540,814, dated June 11, 1895.

Application filed September 21, 1894. Serial No. 523,758. (No model.)

*To all whom it may concern:*

Be it known that I, JOHN HENRY KNOWLES, of the city and county of Philadelphia and State of Pennsylvania, have invented an Improvement in Mechanism for Feeding Sheets of Paper, &c., of which the following is a specification.

My invention relates to mechanism for removing sheets of paper, &c., separately from a pack or pile and delivering them singly to any machine to which it is desired to supply successive sheets.

I have shown my invention embodied in an organized machine designed for separating the sheets from the pack or pile and delivering them in an accurately registered condition to the machine to be fed, but the mechanism may, if desired, be embodied in and become a part of the machine which acts upon the separately fed sheets.

While I have shown and described my machine as specially designed for separating and feeding rectangular sheets, it may, with proper modification, be used for sheets or blanks of diamond or irregular shape.

I have shown my machine as specially designed for feeding sheets to ruling machines but by the omission of certain parts, as will be pointed out hereinafter, the machine may be employed for feeding other machines, such as printing and other presses, machines for folding, punching, cutting, &c.

My machine embraces improvements in the means for holding the sheets in a pack or pile and in devices for guiding and directing the pack in the holder.

My invention also embodies improvements in the devices for individualizing sheets from the others in the pack or pile and for withdrawing the sheets when individualized.

My invention also includes a device for registering the sheets while they are upon the conveyer after they have been removed from the pack or pile.

My invention further includes mechanism for accurately spacing the sheets as they are removed from the conveyer and stop motions for stopping the machine under certain conditions as will be set forth.

In addition to these improvements my machine includes also many features of construction and combination of parts, all of which are fully set forth and claimed hereinafter.

I shall now refer to the accompanying drawings for the purpose of more particularly describing my invention.

Figure 1:
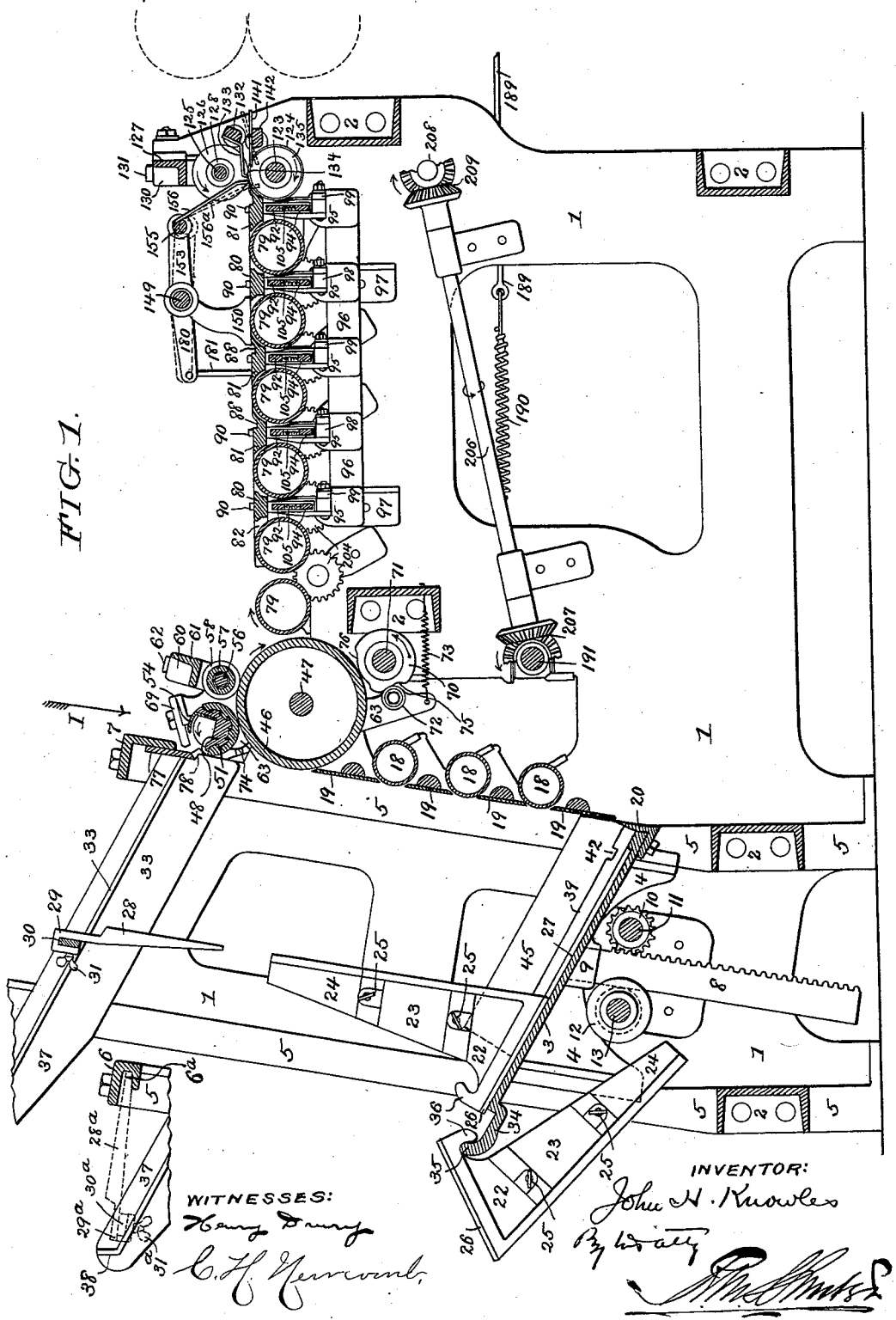
Figure 2:
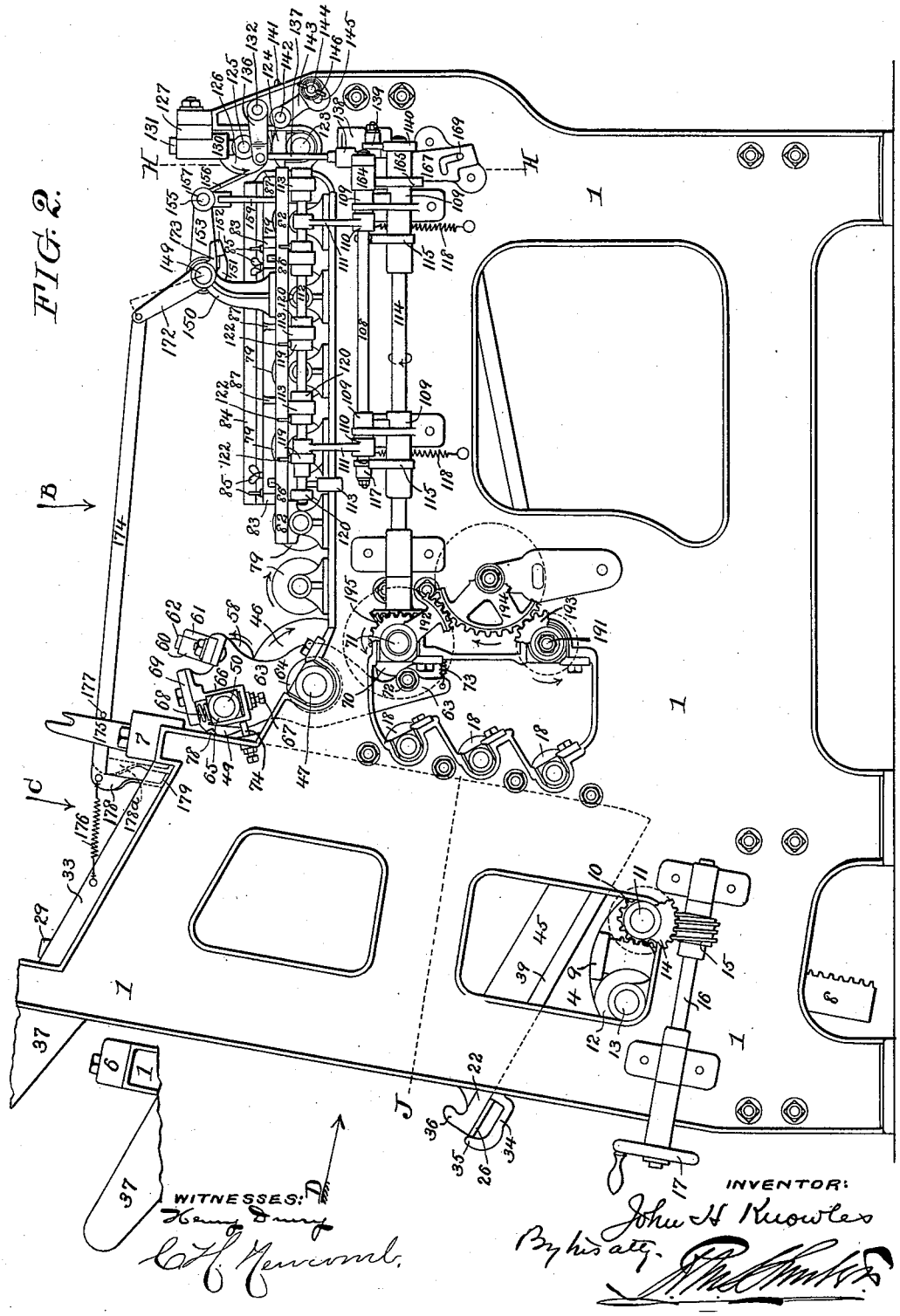
Figure 3:
Figure 4:
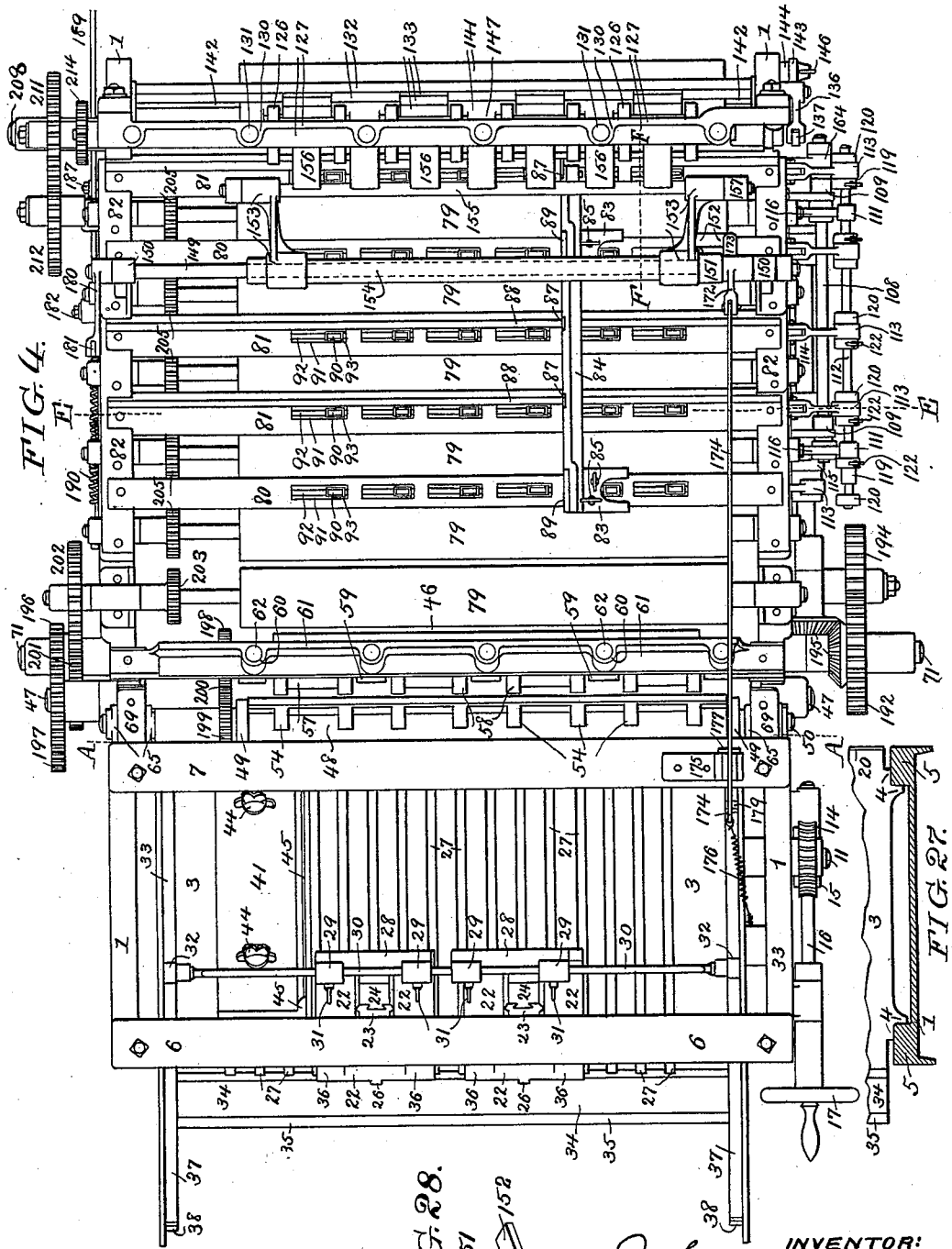
Figure 5:
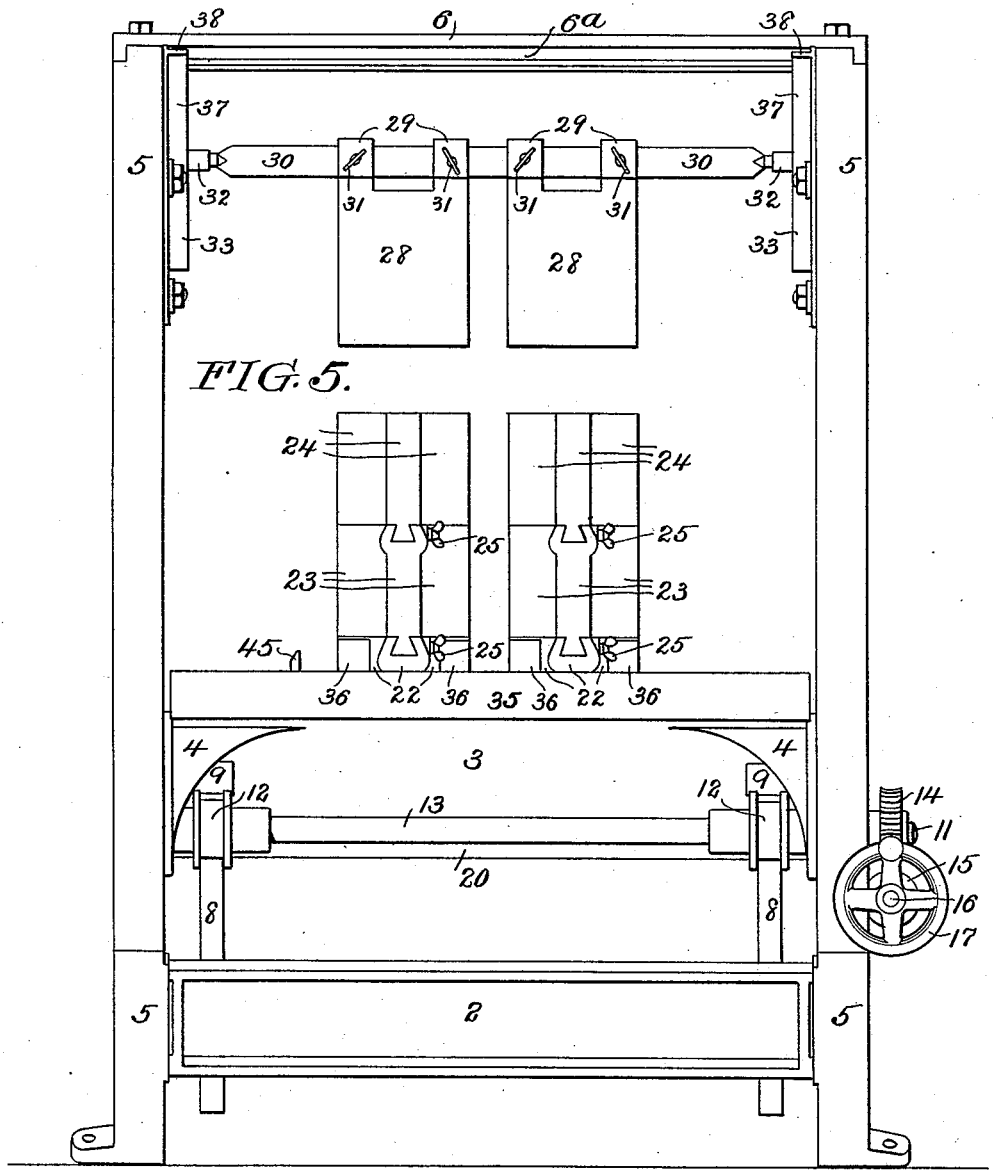
Figure 29:
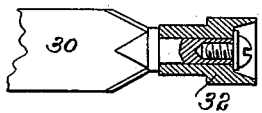
Figure 30:
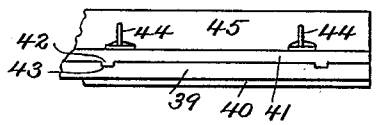
Figure 31:
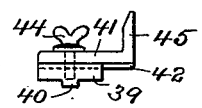

Figure 1 is a longitudinal vertical section of my improved machine for feeding sheets of paper, &c. Fig. 2 is a side elevation of the machine. Fig. 3 is a similar view of the opposite side of the machine. Fig. 4 is a plan view of the machine, the portions of this view to the right of the dotted line A A being taken in the direction of the arrow B, Fig. 2, and the portion to the left of the line A A being taken in the direction of the arrow C, Fig. 2. Fig. 5 is a rear elevation looking in the direction of the arrow D, Fig. 2. Fig. 6 is a front elevation of a portion of the machine. Figs. 7, 8, and 9 are transverse vertical sections on the line E E, Fig. 4, showing the registering device with parts in different positions in the several views. Fig. 10 is a longitudinal vertical section on the line F F, Fig. 4, showing details of the side gage of the registering device. Fig. 11 is a longitudinal vertical section of the sheet-holder, showing parts in positions different from those in which the same are shown in Fig. 1. Fig. 12 is a fragmentary side elevation showing parts of the stop-motion in positions different from those in which the same are shown in Fig. 3. Fig. 13 is a side elevation, with part broken away, of a detail of the stop-motion. Figs. 14 and 15 show details of the disconnecting mechanism of the registering device, Fig. 14 being an elevation of certain parts shown in Fig. 6, and Fig. 15 being a horizontal section on the line G G of Fig. 14. Fig. 16 is a transverse vertical section on the line H H, Fig. 2, showing details of the stop motion. Fig. 17 is a plan view of parts shown in Fig. 16. Fig. 18 is a plan view of the rotary sheet-individualizing and initial-sheet-withdrawing cylinder, partly in section, on the line K K, Fig. 40, and looking in the direction of arrow I in Figs. 1 and 20. Figs. 19 to 26, inclusive, are vertical sectional views taken on the same plane as that on which Fig. 1 is taken, and show the rotary sheet-individualizing and initial sheet-withdrawing cylinder in different positions. Fig. 27 is a horizontal section on the line J, Fig. 2, of one side of the sheet-holder. Fig. 28 is a perspective view of a detail to be hereinafter referred to. Fig. 29 is a detail view, partly in section, of one end of the rod that supports the top sheet-pressers. Figs. 30 and 31 are side and end views, respectively, of the side guide for the pile of sheets in the holder.

For the purpose of enabling the detailed construction of the machine to be easily understood I shall refer to the different portions separately.

*The frame of the machine.*—1, 1, are the side frames connected together by suitable girts or braces 2, 2. The side frames are further braced by the cross bars 6 and 7.

*The sheet holding and supporting device.*— This device is designed to hold a series of sheets on edge, preferably in a position inclined slightly forward, and to permit the sheets to be successively withdrawn from the front of the pack by the individualizing and withdrawing device. In my improved sheet feeding machine the sheets are drawn upward from the front of the holder.

To secure the successful operation of my sheet individualizing and withdrawing device it is necessary that the top edges of the sheets shall lie always in the same plane. To maintain the top edges of the sheets always in the same plane notwithstanding that packs of sheets of different lengths may from time to time be placed in the holder I provide that the bottom support for the sheets shall be vertically adjustable.

In the drawings I have shown the preferable construction of the sheet holding devices; but it will be readily understood that these devices may be modified and varied in construction without in any way affecting the other portions of my invention.

3 is the bottom of the holder on which the edges of the sheets rest. This bottom extends entirely across the machine and is provided at or near each end with suitable guide pieces 4, 4, adapted to embrace the guide posts or ways 5, 5. The guide posts 5, 5, are attached to and may form a part of the side frames 1, 1, and the top of these posts may be connected and steadied by cross tie rails 6, 7. The bottom 3 is free to slide upon its guide ways within certain limits of movement, and it may be horizontal or inclined with its low part toward the front of the holder. The manner in which the bottom is guided is clearly shown in Figs. 1, 11 and 27.

Various means may be employed to adjust the bottom 3 vertically, but I will particularly describe the devices which I have shown for that purpose. Near either end of the bottom of the holder is placed a rack 8. The upper ends of the rack may rest in sockets 9 attached to or forming part of the bottom 3.

10, 10, are pinions secured to a shaft 11, which is supported in suitable bearings attached to the side frames 1, 1. The pinions 10, 10, are adapted to gear into the racks 8, 8.

12, 12, are guide wheels carried by a shaft 13 which is supported in suitable bearings attached to the side frames 1, 1. The guide wheels 12, 12, guide the racks 8, 8, when they move and serve also to brace the racks at the back and keep them in gear with the pinions 10, 10. When the shaft 11 is turned the pinions 10, 10, turn with it and the racks 8, 8, are moved.

The racks 8, 8, pinions 10, 10, and guide wheels 12, 12, occupy such positions in relation to the bottom 3 and its guides that when the racks 8, 8, are moved the bottom 3 will be moved along its guide ways. Thus by turning the shaft 11, the bottom 3 may be adjusted.

On one end of the shaft 11 is secured a worm wheel 14 driven by a worm 15 secured to a shaft 16 supported by suitable bearings carried by a side frame 1. A hand wheel 17, or its equivalent, is secured to the outer end of shaft 16 by which the shaft may be turned. By operating the hand wheel 17 the shaft 16 is turned and through the medium of worm 15 and wheel 14 the shaft 11 is turned also and the bottom 3 is adjusted. The binding of the teeth of the worm wheel with the threads of the worm prevens the bottom 3 from running down from any adjusted position.

The front of the holder may consist of any suitable support arranged at the proper inclination to the bottom 3, but I prefer to construct the front in the manner shown in the drawings. As shown it consists of alternately arranged idler rollers 18 and slats 19, with the peripheries of the rollers projecting slightly beyond the face of the slats so as to act upon the face of the foremost sheet. The rollers may be provided on their ends with journals supported in bearings held by the side frames 1, 1. The slats 19 may be formed of sheet metal and attached to brace rods extending across the machine between the rollers and secured to the side frames 1, 1. The idlers 18 may be of any suitable construction which provides a suitable frictional surface for securing frictional contact with the sheets. These idlers serve to diminish the friction between the sheets and the front of the holder when the sheets are withdrawn. The top of the pack of sheets when placed in operative position extends sufficiently far above the top of the front of the holder to be operated on by the sheet individualizing and withdrawing devices.

Since the bottom 3 is movable while the front of the holder is stationary it is impossible with any ordinary construction, to fit the bottom so closely against the front that a space or crack will not intervene between the front edge of the bottom and the front of the holder. Into such space or crack the foremost sheet or sheets in the pack are liable to drop. Hence I provide the front edge of the bottom 3 with a raised edge or guard 20 against which the lower edges of the foremost sheets bear and are thereby prevented from dropping into the said space, as clearly shown in Fig. 11 where the lines 21 represent the sheets in the pack. The edge 20 may be, as shown, a piece separable from the bottom and secured thereto.

To hold the pack of sheets in place with the foremost sheet in contact with the front of the holder I employ pressers which rest against and press upon the back of the pack. I prefer to employ two sets of these pressers, one set to press against the bottom of the pack which I will term "bottom pressers" and another set to press against the top of the pack which I will term "top pressers." The bottom pressers are required to press the bottom edges of the sheets forward over the bottom of the holder and the upwardly extending parts of these pressers prevent any rearward bending of the rearmost sheets of the pack. The top pressers hold the upper parts of the sheets against the pressure of the sheet individualizing device and, when there are few sheets in the pack, are particularly required, to prevent the upper edges of the sheets from bending backward away from the individualizer. Owing to the different vertical positions occupied by the bottom of the holder for different lengths of sheets it is necessary to provide means for varying the vertical lengths of the pressers. The lengths of either the bottom or of the top pressers, or of both of the pressers may be thus varied but I prefer to vary the lengths of the bottom presser only. I make the top pressers of sufficient length and weight to serve the purpose described and use the same pressers for all lengths of sheets.

Various means may be employed to vary the length of the bottom pressers, but a convenient method, sufficiently accurate for the purpose, is to construct the bottom pressers of several sections adapted to be secured one over the other so as to produce pressers of different heights. I have shown three such sections 22, 23 and 24. I prefer to construct each of these sections of one piece of metal. The sections may be fitted by dovetailed joints one to another and may be secured by set screws 25 as clearly shown in Figs. 1 and 5. The bottom section is in use at all times but the upper sections are removed or supplied as occasion requires. When not in use the upper sections are taken away from the machine. Three sections are shown in position in Fig. 1 and one section in Fig. 11.

The bottom section 22 of the bottom pressers may be provided with a tongue or tongues 26 adapted to the grooves 27 in the upper face of the bottom 3 acting to guide the pressers as they gravitate forward down the incline of the bottom. I provide several of these bottom pressers distributed across the bottom of the holder with provisions for lateral adjustment to different positions to suit various widths or positions of sheets in the holder. In the drawings two bottom pressers are shown but only one may be required for narrow sheets and more than two may be required for very wide sheets. The bottom 3 is provided with a series of grooves 27, more or less numerously placed upon the bottom, and the followers may be shifted from one groove to another to attain any desired position.

Various means may be used to support and guide the top pressers but a convenient method is that shown where the pressers are suspended from a movable rod or bar 30. 28, 28, are the top pressers provided with upward extensions which are bent over to form hooks 29 adapted to grasp the rod or bar 30. Set screws 31 secure the hooks to the bar. The pressers may be moved along the bar and secured by the set screws in any desired lateral position. I prefer to construct each top presser of a single piece of metal. In the drawings two top pressers are shown but only one may be required for narrow sheets and more than two may at times be employed.

On either end of the bar 30 is mounted an antifriction roller 32. A convenient method of mounting these rollers on the rod is shown in Fig. 29.

33, 33, are tracks or ways secured to the side frames 1, 1, or, as shown, to the vertical guide posts 5, 5, one on either side of the holder. The bar 30 extends across the holder with its antifriction rollers resting one upon each of the tracks 43, and thereby the bar 30 and the attached top pressers are supported. The tracks 33 have the same inclination as has the bottom 3. The weight of the bar 30 and attached pressers causes the antifriction rollers to roll down the inclined tracks, thereby causing the top presses to press evenly against the rear of the pack of sheets.

To replenish the pack additional sheets are added from time to time to the back of the pack. This is done by drawing back the pressers and introducing the sheets between them and the back of the pack. I have provided my holder with means for supporting the pressers out of line with the pack of sheets without completely removing them from the holder while introducing a fresh supply of sheets, or at other times if required. 34 is a rearward extension on the bottom 3, the upper surface of which is somewhat below the upper surface of the bottom but terminates rearwardly with an upward curve forming a ledge or projection 35 entirely across the rear of the bottom. Between the ledge 35 and the bottom 3 is a depression or trough formed by the depressed surface of the extension 34. The rear part of the bottom sections 22 of the bottom presser are provided with projections or hooks 36 adapted to engage the ledge 35. When a bottom presser is to be removed from the holder it is first drawn up the incline of the bottom 3 until its further movement is obstructed by contact with the ledge 35, as shown in Fig. 2. The top of the bottom presser is then turned rearward. As it is turned the hooks 36 first fall into the trough above the extension 34 as shown in Fig. 3. As the presser is still further turned the hooks 36 pass over and engage the ledge 35 until the follower hangs downward suspended upon the ledge as shown in Fig. 1. The bottom presser is replaced in operative position by movements the reverse of those described for removing it. The bottom pressers may be thus suspended in any lateral position which they may chance to occupy. For supporting the top pressers out of operative position I provide tracks 33 with rearward extensions 37 upon which the bar 30 may be drawn until its antifriction rollers 32 come into contact with stop pieces 38. The lower parts of the top pressers are then turned upward forwardly and the points of the top pressers inserted in a groove 6ª formed for that purpose in the cross rail 6. The top pressers will then be supported in the position shown by dotted lines 28ª, 29ª, 30ª and 31ª, Fig. 1. The top presser is replaced in operative position by movements the reverse of those described for withdrawing it. It is not, however, always necessary that the top pressers be removed in the manner described when supplying fresh sheets to the pack but the sheets may be added to the pack, if supplied while there yet remains a portion of the pack in the holder, while the top presser still remains in operative position and without stopping the operation of the machine. The bottom pressers may be removed and fresh sheets added to the pack such sheets overlying the rear face of the top presser. After completing the supply of sheets the bottom pressers are replaced. All the parts now occupy the positions shown by full lines in Fig. 11. The top pressers are then withdrawn upward to the positions shown by dotted lines 28ᵇ, 29ᵇ, 30ᵇ and 31ᵇ, Fig. 11. The top edges of the sheets in the rear of the top presser will then fall forward and close up the space which was occupied by the pressers. I prefer to make the top pressers tapering or wedge shaped so as to favor their withdrawal as described. After withdrawal the top pressers are placed in the rear of the pack into the positions shown by dotted lines 28ᶜ, 29ᶜ, 30ᶜ and 31ᶜ, Fig. 11. While the top pressers are being transferred to the rear of the pack the increased weight of the full pack of sheets will be sufficient to press the sheets forward to secure the proper operation of the individualizing device until the top pressers are placed behind the pack.

To maintain the alignment of the side edges of the pack of sheets in any required position across the holder I employ an adjustable side guide. Shown particularly in Figs. 1, 4, 30 and 31.

39 is the base piece to the side guide which is provided with a tongue 40 extending longitudinally on its bottom and adapted to the grooves 27 in the bottom 3 of the holder.

41 is a top slide provided with tongues 42 adapted to grooves 43 arranged transversely across the top of the base piece 39 whereby the top slide may be adjusted transversely across the base piece. By means of thumb screws 44, 44, the top slide can be secured to the base piece in any adjusted position. An edge 45 is turned up along a side edge of the top slide against which the edges of the sheets rest. In adjusting the side guide the base piece 39 is first placed on the bottom of the holder with its tongue 40 in that groove 27 on the bottom that will bring the side guide nearest to the desired position. The top slide 41 is then adjusted across the base piece 39 to bring the side edge 45 to the exact position and is then clamped by the screws 44. One guide for one side of the pack of sheets is all that is required in this machine. When the side guide is adjusted to the required position the sheets are placed in the holder with the lower side edges of the sheets bearing against the side guide.

*The sheet individualizing and sheet withdrawing mechanism.*—This mechanism consists of a withdrawing drum, a rotary sheet individualizing and initial sheet withdrawing cylinder, and a frictional withdrawing roller. In describing this mechanism I shall refer more particularly to Figs. 1, 2, 3, 4 and 18 to 26 inclusive.

46 is the withdrawing drum mounted on a shaft 47 which may be supported in suitable bearings carried by the side frames 1, 1. This drum may be constructed in any suitable manner but I prefer to construct it with a continuous surface covered with proper frictional material for taking a frictional hold on the sheets. The drum 46 is placed opposite the front of the pack of sheets at a proper distance below the top of the same. The surface of the drum is placed near to but does not press upon the front of the pack and has a constant rotation in the direction of the arrow.

48 is the sheet individualizing and initial sheet withdrawing cylinder. The body part of this cylinder may be attached to head pieces 49 provided with journals 50, and the body part, heads 49 and journals 50 may if desired be in one piece. The said body part and the devices carried thereby have a constant rotation in the direction of the arrow. On one side of said body part is fixed a frictional pad 51 extending the entire length of the body but covering only a part of its periphery. This pad is preferably formed of rubber and may be fixed to the said body part by being embedded in grooves cut therein, as shown. The outer surface of the pad 51 projects beyond the periphery of the other portions of the cylinder and is adapted to roll upon the surface of the drum 46. The forward edge of the pad 51 is continuous from end to end but the rear edge is cut away at intervals to form notches 52 and intermediate ridges 53. These notches and ridges are clearly shown in Fig. 18, and are indicated by dotted lines 52 in Figs. 19 to 26. In forming the notches 52 a portion of the said body part by which the pad is carried may be cut away also. If preferred the notches 52 may extend entirely across the pad 51 dividing it into a series of segments, but I prefer to have the entire forward edge of the pad continuous as such an edge makes better frictional contact with the edges of the sheets when they are first seized between the pad and the withdrawing drum. The body of cylinder 48, opposite the pad 51 is cut away to form a longitudinal recess to receive the upper edges of the sheets during a certain part of each revolution of the cylinder. The said body part is provided on that edge next forward from the friction pad 51 with a series of fingers 54 bent concentrically to the axis of the cylinder and projecting forward partly across the longitudinal recess in the body. A convenient way of forming these fingers is to cut spaces from the edges of a plate or sheet of metal leaving the fingers attached to the plate and after the fingers are bent to the required shape to secure the plate to the said body part. In the drawings 55 represents such a plate. The fingers 54 are arranged opposite the ridges 53 of the pad 51 so as to rotate in the same planes with them and may be of the same width as the ridges. The sheet individualizing and initial sheet withdrawing cylinder as described is located above the withdrawing drum 46 adjacent to the upper edge of the pack of sheets.

The frictional withdrawing roller 58 is located over the drum 46 immediately beyond the cylinder 48 and may be constructed and mounted in any manner adapted to secure frictional contact with the drum 46, but I prefer to construct and mount this roller in the same manner in which the similar rollers are constructed and mounted in the feeding machine described in the patent to me, No. 535,380, dated March 12, 1895, and reference may be had to that patent for a detailed description of this roller and herein I will only name such parts of this roller as I have shown in the drawings which accompany this specification. In the patent referred to the rollers to which reference is made are called the "oscillating frictional pressure roller" and the "assistant frictional pressure roller."

56 is the shaft of the frictional withdrawing roller.

57 are the spools mounted on the shaft 56 and carrying frictional disks 58.

59 are the spring pressed bearings of the shaft 56 held in sockets 60 which form part of the cross bar 61.

62 are the key plugs in the ends of the sockets by means of which the tension of the spring pressed bearings may be adjusted.

63, 63, are frames one on each side of the machine and each provided with a boss 64 fitting an extension of the corresponding bearing of the shaft 47 of the withdrawing drum. The frames 63 are free to rock or oscillate about the bearings of the shaft 47 and the axis of oscillation of the frame 63 is therefore the same as the axis of rotation of the drum 46.

In Fig. 2 dotted lines show the outline of one frame 63 and the boss of the frame is shown encircling the bearings of shaft 47.

The journals of the cylinder 48 are supported by bearings 65 carried by the rocking frame 63. The ends of the bar 61 which carries the bearings of the withdrawing roller 58 may also be attached to the rocking frames 63. Thus when the frames 63 rock the cylinder 48 and the roller 58 oscillate with the frame so that the cylinder 48 with its frictional pad 51 is caused to alternately approach and recede from the pack of sheets, and the pad 51, during a portion of the time that it is turned toward the pack, is pressed against the sheets. It results from the manner of mounting the rocking frame 63 that the cylinder 48 and roller 58, move concentrically over the surface of the withdrawing drum 46 when they are oscillated.

The bearings 65 are placed in guide ways 66 in the rocking frames 63 and are free to move therein. The guide ways 66 are so disposed in the frames that the bearings may move in radial lines from the center of the drum 46. The downward movement of the bearings is limited by set screws 67 passing through the lower walls of the guide ways. Over the bearings 65 are placed springs 68 which press upon the bearings and are held by cap pieces 69. (See Figs. 2 and 3.) These springs tend to force the bearings 65 toward the set screws 67 and cause the cylinder 48 to exert a yielding pressure against the withdrawing drum 46 when the pad 51 of the cylinder presses against the drum. By adjusting the set screws 67 the pressure between the pad 51 and the drum 46 may be regulated. The set screws 67 also serve to prevent the periphery of the cylinder 48 from making contact with the drum except when the friction pad is adjacent to it.

To rock or oscillate the frame 63 I employ cams 70 secured to and rotating with the shaft 71 which is held in suitable bearings supported by the side frames 1, 1. The cams 70 operate upon depending portions of the frames 63 and may communicate motion to the frames through the medium of frictional rollers 72 carried by the frames. Springs 73 connect the frames 63 to the side frames 1, 1, or to one of the girts 2 of said frames, and serve to maintain the frames 63 or their rollers 72 in operative contact with the cams 70. (See Fig. 1.)

Set screws 74 passing through bosses on the side frames 1, 1, limit the extent of oscillation of the rocking frames in that direction in which the upper part of the frame approaches the pack of sheets. By adjusting the screws 74 the limit of oscillation of the frame and consequently the pressure which will be exerted by the frictional pad 51 against the sheets may be varied. Each cam is provided with two depressions 75 and 76 in its periphery, as shown in Fig. 1. The depressions 75 are of such depth that when the frictional rollers 72 fall into them the movement of the frames 63 will be stopped by contact with the set screws 74 before the rollers 72 have fully entered the depressions. The frictional rollers 72 will descend more or less deeply into the depressions 75 according to the adjustment of the set screws 74. The depressions 76 are less deep than the depressions 75 so that when the frictional rollers 72 fall into them they may rest upon the bottom of the depressions before the rocking of the frame 63 is limited by the set screws 74.

As the cams 70 are formed with the two depressions 75, 76, in their peripheries, the frames 63 will receive two complete oscillations with each revolution of the cams. The shaft 71 which operates the cams 70 is so connected by gearing with the cylinder 48 that it rotates in unison with it and consequently the cylinder 48 will make two complete oscillations over the drum 46 with each revolution on its axis.

77 is a guard strip carried by the cross tie rail 7 and depending therefrom toward the front upper edge of the pack of sheets. The lower edge of this guard strip is cut away at intervals to form a series of depending fingers 78 across the entire width of the sheets in the pack. These fingers are clearly shown in Fig. 18 and in Figs. 19 to 26 inclusive. If preferred the fingers 78 may be independent of the strip 77 and secured thereto or the strip may be dispensed with and the fingers secured directly to the tie rail 7, but the construction shown furnishes a convenient means for adjusting the fingers all together relatively to the top edges of the sheets by sliding the strip upon the rail 7.

The fingers 78 are adjusted to extend a short distance below the front upper edges of the sheets in the pack and to bear upon and retain those edges in line with the face of the front of the holder. The fingers 78 also serve to prevent the edge of any sheet except the foremost from being separated from the pack, by pressing against the sheets and thereby acting as a drag upon their upper edges. The ridges 53 and the fingers 54 of the cylinder 48 pass through the spaces between the fingers 78 when the cylinder 48 rotates.

I will now explain the operation of the parts described in individualizing and withdrawing the sheets. The finger 78 having been adjusted to a proper position relatively to the other parts of the individualizing and withdrawing mechanism, the set screws 74 and 67 having been adjusted to respectively regulate the pressure of the frictional pad 51 against the pack and against the withdrawing drum 46, a pack of sheets is placed in the holder and adjusted vertically by means of the adjustable bottom until the top edges of the sheets rise slightly above the fingers 78 into the position indicated by dotted lines 21, Figs. 19 to 26 inclusive. Supposing the sheet individualizing and initial sheet withdrawing cylinder to be moved away from the pack, e. g., into the position shown in Fig. 25, the process of withdrawing a sheet from the pack may be commenced.

As the sheet individualizing and initial sheet withdrawing cylinder 48 revolves from the position shown in Fig. 25 to the position shown in Fig. 19 the frame 63 is rocked by the action of the springs 73 and cams 70 and the cylinder 48 is moved toward the face of the pack of sheets until it reaches the position shown in Fig. 19 with the ridges 53 of the friction pad 51 bearing against the face of the foremost sheet in the pack near its upper edge at intervals between the fingers 78. During this movement of the rocking frame the frictional rollers 72 fall into the depressions 75 of the cams 70.

As the cylinder 48 revolves from the position shown in Fig. 19 to the position shown in Fig. 20 the cylinder does not oscillate but bears constantly against the pack of sheets and the frictional action of the ridges 53 draws the foremost sheet in the pack downward from under the fingers 78 into the position shown by dotted line $21^a$ in Fig. 20, thereby removing the entire upper edge of the sheet from under the fingers 78 and individualizing that sheet from other sheets in the pack.

As the cylinder 48 revolves from the position shown in Fig. 20 to the position shown in Fig. 21 it moves away from the pack of sheets under the action of the frames 63 and cams 70 and as it moves away the frictional action of its pad 51 upon the foremost sheet is released. This is caused both by the forward oscillation of the cylinder and by the forward movement of the extreme rear edge of the frictional pad by reason of rotation of the cylinder. As the individualized sheet is released from contact with the frictional pad of the cylinder its upper part, because of the natural elasticity of the sheet, straightens out from the buckled position shown in Fig. 20 to the straight position shown in Fig. 21. As the sheet straightens out its edge cannot again pass under the fingers 78, because the subjacent sheets of the pack have moved forward and press against the fingers. The upper edge of the sheet therefore passes outside of the fingers 78. The lower edges of the fingers may be beveled so as to guide the edge of the sheet if it comes in contact with the fingers as it straightens out.

As the cylinder 48 revolves from the position shown in Fig. 21 to the position shown in Fig. 22 it oscillates again toward the pack of sheets by the action of the springs 73 and cams 70 on the frames 63. During this oscillation the frictional rollers 72 fall into the depressions 76 of the cams 70 and the fingers 54 pass through the spaces between the fingers 78 to the rear of the top edge of the individualized sheet as shown in Fig. 22. The purpose of the oscillation last described is to insure the passage of the fingers 74 behind the sheet. For sheets of moderate stiffness which would drop forward at their upper edges as they straightened out after being drawn from under the fingers 78 the oscillation last described would not be required.

As the cylinder 48 revolves from the position shown in Fig. 22 to the position shown in Fig. 23 it oscillates away from the pack by the action of the cams 70 operating on the frames 63, and during this movement the individualized sheet is bent forward by the action of the fingers 54 into the position shown by dotted line 21ª in Fig. 23. The edge of the sheet as it is bent forward passes through the recessed portion of the cylinder.

As the cylinder 48 revolves from the position shown in Fig. 23 to the position shown in Fig. 24 it does not oscillate, but during this movement the individualized sheet is bent still farther forward over the surface of the drum 46 by the action of the fingers 54.

As the cylinder 48 revolves from the position shown in Fig. 24 to the position shown in Fig. 25 it does not act upon the individualized sheet, but the forward edge of the frictional pad 51 travels forward and comes in contact with the surface of the sheet lying between the cylinder and the drum 46.

As the cylinder 48 revolves from the position shown in Fig. 25 to the position shown in Fig. 26 the frictional pad 51 operates upon the sheet 21ª by pressing it against the frictional drum 46 and thereby causes the sheet to be partly withdrawn from the pack so that its forward edge passes under the frictional pressure withdrawing roller 58 as shown in Fig. 26. The withdrawing drum 46, the cylinder 48 and roller 58 are so driven that the pad 51 and the roller 58 have the same surface speed as the withdrawing drum 46 to insure the proper action of these parts in withdrawing the sheets. During the movement of the cylinder 48 from the position shown in Fig. 25 to that shown in Fig. 26 it assumes the successive positions shown in Figs. 19, 20, 21 and 22, and individualizes a second sheet from the pack in the manner previously described for individualizing the sheet 21ª. The dotted line 21ᵇ in Fig. 26 represents the second individualized sheet.

As the cylinder 48 rotates from the position shown in Fig. 26 the sheet 21ª is completely withdrawn from the pack by the continued action of the roller 58 and the withdrawing drum 46.

By the action described one sheet is separated from the pack with each revolution of the sheet individualizing and initial sheet withdrawing cylinder and the withdrawal of each sheet from the pack may be commenced before the sheet previously operated upon is completely withdrawn. The forward edge of each succeeding sheet is bent over the preceding sheet while the rearmost portion of that sheet yet lies upon the withdrawing drum and is moving with it and the two sheets are thereafter drawn simultaneously from the pack. If the sheets being operated upon are very long more than two sheets may thus be in process of withdrawal at one time.

While I prefer to use the frictional pressure withdrawing roller 58 described to cause the continuous movement of the sheets from the pack the use of this roller is not essential to the withdrawal of sheets. If this roller were not used each sheet would be withdrawn to an extent equal to the width of the pad 51 with each revolution of the cylinder 48 but during the interval while the pad 51 is turned out of contact with the withdrawing drum 46 the partially withdrawn sheet would lie loosely upon the drum without being further withdrawn from the pack until the pad 51 again came in contact with the sheet. Thus by successive actions between the pad 51 and the withdrawing drum the sheet would, finally, be completely withdrawn from the pack.

*The sheet-registering mechanism.*—Should any of the sheets be out of proper alignment after they are withdrawn from the holder it is necessary to restore such sheets to their proper position before they are further operated upon. The mechanism which I employ for this purpose consists of a conveyer to receive and support the sheets as they are withdrawn from the holder, front stops to temporarily stop the sheets successively to permit them to be registered, a side registering stop and devices for moving the sheets laterally against the side stop. In describing this part of my invention I shall refer more particularly to Figs. 1, 2, 3, 4, 6, 7, 8, 9, 10, 14 and 15.

The conveyer, which I have shown, consists of a series of transverse rollers 79 arranged in a plane extending forward from the withdrawing drum. These rollers have a constant rotation in the direction of the arrows and have a surface speed equal to or slightly in excess of the surface speed of the withdrawing drum. The two rollers adjacent to the withdrawing drum I have shown close together but the other rollers of the series are placed at some distance apart to permit certain devices to pass between them. The rollers 79 may be of any ordinary construction having a frictional surface adapted to carry forward the sheets which may be laid upon them. The journals of the rollers may be supported by suitable bearings carried by the side frames 1, 1. As the withdrawal of a sheet from the pack commences before the previous sheet has been fully withdrawn it is apparent that when the sheets are laid upon the conveyer they will overlie one another in a series with the forward edge of each sheet somewhat in advance of the forward edge of the next following sheet, and that the sheet which is most advanced of all in the series will be the lowermost sheet and will lie directly upon the conveyer. When the lowermost sheet has passed fully from the control of the withdrawing devices and lies free upon the conveyer one or more of the sheets which overlie it may still be under the action of the withdrawing means. The series of rollers 79 should therefore be sufficiently extended to permit the longest sheet which is to be fed by the machine to lie free upon the rollers. As the advanced free sheet of the series lies next to the conveyer and is partially covered by the succeeding sheets the means which are employed to register the sheet can act only on its under side by operating from below the conveyer.

The front stops used for stopping the sheets while being operated upon by the side registering devices may be of any proper construction and may be operated in any convenient manner. The stops which I prefer to employ are a part of the final spacing out and separating devices and will be particularly described when I describe those devices. In the drawings these stops are marked 133. The front stops reciprocate and at one period of their reciprocation pass across the pathway of the sheets as they are moved forward by the conveyer, so that each sheet in its forward movement strikes the stops and is arrested. The side registering of the arrested sheet is then accomplished after which the front stops move out of the pathway of the sheet and permit it to move forward. During the instant that the sheet is held by the stops the overlying sheets continue their forward movement sliding over the stationary bottom sheet. The distance between the forward edges of successive sheets as related to the surface speed of the conveyer should be such that, after the bottom sheet is stopped and before the next overlying sheet can reach the front stops on its forward movement, sufficient time will elapse to permit the bottom sheet to be registered or moved into proper alignment, to allow the front stops to move away and permit the passage of the forward edge of the bottom sheet beyond the stops, and for the stops to return to intercept the next sheet.

The devices which I employ to move the sheets laterally to bring them into proper alignment consist of a series of frictional pads which rise up through the spaces between the adjacent rollers of the conveyer and lift the sheet from the conveyer and carry it while so lifted, laterally against a side stop and then drop below the surface of the conveyer and there remain until the next sheet is to be registered.

80 and 81 are bars which pass across the machine between adjacent rollers 79, 79. The ends of these bars may be supported in any suitable manner from the side frames 1, 1. I have shown them supported on longitudinal bars 82 which rest upon and are secured to ear pieces extending from the top of the bearings of the rollers 79. The top surfaces of the bars 80, and 81 lie slightly below the plane tangentially to the tops of the rollers 79. These bars serve to prevent the sheets sagging between the rollers as they pass over the conveyer and also serve other purposes which are hereinafter described.

The details of the registering side stop, which I will now describe, are more particularly shown in Figs. 2, 4, 7 and 10.

83, 83, are shoe pieces adapted to embrace the cross bars 80 which may be beveled as shown and are rigidly connected by a tie rod or bar 84. The shoe pieces 83 are adapted to slide along the bars 80 and, as the two pieces 83 are rigidly connected by the bar 84, they will move in unison, and the bar 84, which is so mounted as to be exactly longitudinal in the direction in which the sheets move, will maintain its longitudinal alignment wherever it may be carried by the shoe pieces. By means of set screws 85 the shoe pieces may be secured in any adjusted position. The shoe pieces 83 are cut away as at 86, Fig. 10, to span over the registry pads when they rise. Depending from the bar 84 are stop fingers 87 carried by the bar 84 and projecting into grooves 88 in the cross bars 81. When the sheet is registered it is brought up against the faces 89 of the shoe pieces 83 and against the fingers 87. As the ends of the fingers 87 extend below the surface of the sheet into the grooves 88 the edge of the sheet cannot pass under the ends of the fingers when it is moved against them.

90, 90, are the friction pads which lift the sheet and move it laterally to register it, and they may be more or less numerously distributed over the entire surface of the conveyer. Various means may be employed to support and move these pads. I will describe the means which I prefer to employ for that purpose. The cross bars 80 and 81 are provided with a series of slots 91, through which the pads are free to move. The pads 90 are secured to bars 92 extending across the machine under the bars 80 and 81, all the pads which pass through one bar 80 or 81 being secured to one bar 92. I prefer to make the pads 90 of rubber and to secure them in sockets 93 riveted to the bars 92.

I provide means to operate each bar 92 so as to cause the pads 90 to first rise and lift the sheet, then to move the sheet laterally against the registering stops and then to descend vertically and move back to the original position and there remain until the next sheet is to be registered. If a sheet should strike the side stops before the pads 90 complete their lateral movement the pads will slide under the sheet without doing any injury to it.

The bars 92 rest with their lower edges upon other similar bars 94. The bars 92 and 94 are held loosely in vertical slots in standards 95 and are free to slide longitudinally therein while the side risers of the standards maintain each pair of bars 92 and 94 vertically one over the other as shown. The standards 95 are secured to longitudinal bars 96 held by brackets 97 secured to the side frames 1, 1.

Each top bar 92 is reciprocated longitudinally and is caused to rise and fall as it reciprocates by mechanism operated by the longitudinal reciprocation.

I will describe the construction and mode of operation of one pair of bars 92 and 94 and it will be understood that each pair of bars 92 and 94 is similar in construction and operation. Pivoted to an arm 98 carried by one of the standards 95 is a pawl 99 adapted to engage a notch on the edge of the bar 94 and hold the bar from being moved longitudinally until the pawl is disengaged from the notch.

100 is an arm carried by the pawl 99.

101 is a spring connecting the arm 100 of the pawl 99 to the standards 95 and tending to maintain the pawl normally against the bar 94.

102 is a pin carried by the bar 92 and adapted to engage the arm 100 of the pawl 99, when the bar 92 moves outward, and to throw the pawl out of engagement with the bar 94.

As shown in Fig. 7 the bars 92 and 94 are each provided on their adjacent edges with similar and adjacent but oppositely directed inclines 103 and 104.

105 is a spring connecting the bars 92 and 94 and tending to draw the bars longitudinally in opposite directions.

106 and 107 are stops carried respectively by the bars 92 and 94 and adapted to make contact with one another.

When the parts are in the position shown in Fig. 7 the registering device is at rest. When a sheet is to be registered the bar 92 moved outward, i. e., toward the side registering stops. The bar 94 being retained by the pawl 99 cannot move with the bar 92 when that bar makes its outward movement. The incline 103 of the bar 92, therefore, moves up the incline 104 on the bar 94 and the bar 92 is raised and the frictional pads 90 carried by it are projected through the slots 91 in the cross bars 80 or 81. The pads 90 when thus projected lift the sheet from the rollers 79. After the bar 92 has been lifted up it moves horizontally outward resting on top of bar 94 causing the separation of the stops 106 and 107 and the extension of the spring 105 and during this movement the pads 90 move the sheet laterally until its side edge is brought in contact with the side stops 87, and 89. When the bar 92 has moved outward to the position shown in Fig. 8 the pin 102 engages the arm 100 of the pawl 99 and the farther outward movement of the bar 92 causes the pawl to become disengaged from the bar 94 and release that bar. The moment the bar 94 is thus released it is moved outward by the spring 105 until the stop 107 strikes the stop 106. As the bar 94 slides outward its incline 104 passes under the incline 103 of the bar 92 whereupon the bar 92 being unsupported descends by virtue of its own weight to the position shown in Fig. 9 with the pads 90 below the surface of the bars 80 or 81. The bar 92 now makes its return stroke and, because its stop 106 is in engagement with the stop 107 on the bar 94, it carries that bar back until all the parts come into the original position as in Fig. 7, the pawl 99 dropping into the notch in the bar 94 under the action of the spring 101. The movements described are repeated for each sheet registered.

I will now describe the means by which the bars 92 are reciprocated horizontally.

108 is a rock shaft mounted parallel to the side frame 1 in bearing brackets 109.

110, 110, are bell crank levers secured to the rock shaft 108. The upwardly extending arms 111 of the bell crank levers 110 support a rod 112 parallel to the shaft 108 and connected by links 113 with the outer ends of the bars 92. When the rock shaft 108 is rocked the rod 112 is oscillated to and from the side of the machine, and the bars 92 are reciprocated.

114 is a constantly rotating shaft mounted in the bearing brackets 109 and located below and parallel with the rock shaft 108.

115 are cams carried by shaft 114 and adapted to operate upon the arms 116 of the bell crank levers 110 and rock the levers. The cams may operate the levers through the medium of frictional rollers 117.

118 are springs between the arms 116 and the side frame 1 which tend to draw the arms 116 normally against the cams 115.

By referring to Figs. 7, 8 and 9 it may be readily understood that when the shaft 114 turns in the direction indicated by the arrow the combined effect of the cams 115 and springs 118 exerted on the arms 116 will give to the bell crank levers 110 an intermittent rocking motion and that the bell crank levers through the medium of the rod 112 and links 113 will communicate an intermittent longitudinal reciprocation to the bars 92. The cams 115 are preferably shaped to give the bars 92 a quick outward stroke to register the sheet. The character of the return stroke of the bar is immaterial.

The links 113 may be mounted on thimbles 119 secured to rod 112, see Figs. 14 and 15, and may be held against lateral displacement on one side by shoulders on the thimbles and on the other side by collars 120 secured to rod 112. As the body of the thimble 119 interposes between the rod 112 and the link 113 the eye of the link is larger than the diameter of the rod 112. A portion of the eye of each link is cut away to form an opening 121 through the eye of a width slightly greater than the diameter of the rod 112 but less than the diameter of the thimble 119 so that the links cannot slip off the thimbles. The thimbles are secured to the rod 112 by set screws 122 and by loosening a set screw a thimble 119 may be moved along the rod 112 out of the eye of the corresponding link 113 to release the link 113 and permit it to be lifted from the rod 112 by passing the opening 121 in the eye of the link over the rod. When the bar 92 is in its inward position, as shown in Fig. 7, the disengaged link may be dropped into the position shown by dotted lines in that figure and the bar 92 to which such disengaged link is attached will be out of operation while all of the other undetached bars will continue in operation. In Figs. 2 and 4 the link nearest to the sheet holder is shown disengaged from the rod 112. By these means any one of the bars 92, or any number of those bars may be thrown out of operation without interference with the operation of the remaining bars.

*The final spacing-out and separating devices.*—These devices consist of a pair of feeding rollers, stop gages for causing the sheets to be presented to the rollers at precise intervals and an adjustable sheet guide to direct the sheets as they pass from the rollers. In describing these devices I shall refer more particularly to Figs. 1, 2, 3, 4, and 6.

The lower feeding roller consists of a series of disks 124 carried by a shaft 123, mounted in suitable bearings on the side frames 1, 1, and the upper feeding roller consists of a series of disks 126 carried by a shaft 125. The disks 126 may be mounted on the shaft 125 in any well known manner and the shaft may be supported in any suitable bearings properly attached to the side frames of the machine, but I prefer to mount these disks in the same manner and to provide bearings of the same description as I have shown and described in connection with the similar top feeding roller in the patent granted to me, No. 538,380, dated March 12, 1895, and I will here mention only those parts of the disks and bearings which I have shown in the accompanying drawings and reference may be had to the said patent for a detailed description of the parts.

127 is the cross bar which supports the bearings of the shaft 125. This bar is secured at either end to upward extensions of the side frames 1, 1.

128 are the spools on which the disks 126 are mounted.

129 are the spring pressed bearings of the shaft 125 held in sockets 130 on the cross bar 127.

131 are the key plugs in the ends of the sockets by means of which the tension of the spring pressed bearings may be adjusted.

The disks 124 and 126 may be composed externally of any frictional material suitable for acting upon the sheets which pass between them. Each disk 124 runs in contact with a disk 126, and the disks must be properly placed to receive the sheets as they pass from the conveyer. The feeding rollers rotate constantly in the direction indicated by the arrows and as each advanced free bottom sheet on the conveyer is presented to them it is seized by the disks 124, 126, and is drawn by them from the conveyer. Means are provided to vary the speed of the feeding rollers relatively to the other parts of the machine.

The stop gage which I prefer to employ consists of a series of intermittently oscillating stop fingers operating in connection with one of the feeding rollers.

132 is a rocker bar supported by bearings in the side frames 1, 1, adjacent to the top feeding roller. I have shown the bar 132 forward of the top feeding roller because I reserve the space in the rear of the roller for the operation of stop motion fingers.

133 are a series of stop fingers carried by the rocker bar 132 and terminate in lips or projections 134 directed toward the lower feeding roller and resting upon it a short distance from the intaking line between the feeding disks on that side of said line on which the sheets approach the disks. These lips are adapted to intercept the advanced free bottom sheet as it passes from the conveyer to the feeding rollers and prevent it from being taken in by the disks 124, 126, until the stop fingers are raised. The lips 134 are placed as near the intaking line of the disks of the feeding rollers as is possible without danger of the sheet which is stopped being seized by the disks. I have provided the disks of the lower feeding roller with shoulders 135 upon which the lips 134 rest. I prefer to make the fingers 133 and their lips 134 nearly as wide as the spaces between adjoining disks 124. I have shown one finger 133 opposite each spool 128 of the upper feeding roller. The peripheries of the shoulders 135 may be somewhat less in diameter than the disks 124 so that the lips 134 when resting upon the shoulders will descend below the surface of the sheet supported on the disk 124. These parts are shown more particularly in Figs. 1, 4 and 6. Instead of providing shoulders 135 on the disks the entire surface of the spools between the disks may be made of a proper diameter to support the lips 134, but I prefer to use the shoulders because the spaces between the shoulders permit the operation of certain other parts as will be shown. When the bar 132 is rocked the fingers 133 with their lips 134 are lifted and the sheet is permitted to pass between the feeding disks. The lips 134 descend before the sheet has entirely passed between the disks and rest upon the moving sheet until the rear edge of the sheet has passed beyond the lips.

Various means may be employed to rock the bar 132, but I will describe the means which I prefer to employ for that purpose, referring particularly to Figs. 2, 4 and 6.

136 is an arm carried by the bar 132 to the outer end of which is pivoted a rod 137 passing through and sliding freely in a guide bearing 138 which is secured to the side frame 1.

140 is a cam on the shaft 114 acting on the lower end of the rod 137 and adapted to reciprocate it in the guide 138 and thereby rock the bar 132. The end of the rod 137 may be provided with a roller 139 to make contact with the cam 140. The end of the rod will be held in operative contact with the cam 140 by gravity but a spring may be employed for that purpose if desired. The cam 140 is of such a shape as to cause the stop fingers 133 to rise quickly and immediately drop and to remain for the most part in a depressed position.

The sheet guide which I have shown consists of a plate 141 placed in front of the feeding rollers. The plate 141 may be carried by a bar 142 supported in bearings in the side frames 1, 1, and the bar 142 may be rocked in its bearings to adjust the plate 141 at any required angle to the feeding rollers.

143 is an arm carried by the bar 142, and provided on its outer end with a slot 145 which receives a stud 144.

146 is a thumb nut on the stud 144 adapted to clamp the arm 143 in any adjusted position permitted by the slot 145 and thereby, through the medium of the arm 143 and the bar 142, to secure the plate 141 in any adjusted position. The edge of the plate 141 adjacent to the feed rollers is provided with a series of notches adapted to span over the disks 124. The projecting parts 147 of the plate between the said notches extend between adjacent disks 124 below their peripheries and serve to guide the forward edge of the advancing sheet upon the plate 141. These projecting parts are clearly shown in Fig. 4.

The sheet guide 141 may be maintained in a horizontal position as shown in full lines in Fig. 1 to guide the sheets smoothly from the feeding rolls or the plate may be directed upward as shown in dotted lines in Fig. 1. When the so called "striker" movement is employed on the ruling machine it will be necessary to place the guide as shown in dotted lines. When the "striker" is used the sheets must be fed either in close succession or with small spaces between adjacent edges. The operation of the "striker" stops, temporarily, a sheet on the blanket of the ruling machine, usually with the rear edge of the stopped sheets projecting rearward from between the intaking rollers of the machine. In Fig. 1 the dotted circles are intended to represent the intaking rollers of a ruling machine. The sheet fed next after a sheet is stopped by the "striker" must have its forward edge overlap the rear edge of the stopped sheet. While the sheet is stopped by the "striker" with its rear edge extending rearward from between the intaking rollers of the ruling machine, the feeding rollers of the feeding machine continue to pass a sheet forward and because the guide plate 141 is directed upward the forward edge of such sheet is projected over the rear edge of the stopped sheet. When the "striker" is not in use it is usual to keep the guide plate 141 in a horizontal position.

By making proper adjustments in the operation of my spacing out and separating device I am able to take the partially separated sheets from the conveyer and deliver them over the feed guide in either one of three distinct orders of succession, with the adjacent edges in contact, with spaces of any width between adjacent edges, or with the forward edge of each sheet lying over the rear edge of the sheet which precedes it. In feeding ruling machines, it may be necessary to feed sheets in either one of these three ways; but whatever the way of feeding it is necessary to use the stop fingers to secure accuracy in the succession of the sheets. In practice it is found that when the sheets arrive at the feeding rollers their forward edges are not at perfectly equal distances apart and the operation of the stop fingers regulates the spacing between the sheets and causes them to be delivered to the feeding rollers at precisely equal intervals. This is accomplished by connecting the feeding rollers through positive driving mediums to the parts described for operating the stop fingers so that the successive elevations of the stop fingers correspond to successively equal periods of rotation of the feeding disks.

For feeding sheets with their adjacent edges in contact I adjust the speed of the feeding rollers so that they will pass each sheet between them in the exact time that the sheets are successively delivered by the stop gages from the conveyer. For feeding sheets with spaces between adjacent edges I adjust the speed of the feeding rollers so that they will pass a sheet between them and also turn a circumferential distance equal to the length of the spaces which are to be between the sheets before the next sheet is delivered from the stop gages. For feeding sheets with the forward edge of each sheet lying over the rear edge of the preceding sheet I adjust the speeds of the feeding rollers so that each succeeding sheet is delivered by the stop gages before the feeding rollers have completely passed the preceding sheet between them; and the extent to which the adjacent edges of the sheets will lap depends upon the speed of the feeding rollers as related to the frequency of the rising of the stop fingers. Instead of varying the speed of the feeding rollers to produce these three ways of feeding the same effect may be produced by keeping the speed of the feeding rollers constant and making equivalent variations in the speed of the mechanism which removes the sheets from the pack and delivers them to the feeding rollers.

*The stop-motion devices.*—These devices are adapted to stop the mechanism whenever the sheets do not arrive at the stop gages at the proper time or whenever the pack of sheets becomes reduced to a certain extent. In describing these devices I shall refer more particularly to Figs. 1, 2, 3, 4, 12, 13, 16 and 17.

149 is a shaft extending across the machine over and near the forward end of the conveyer and may be supported by bearings 150 carried by the side frames 1, 1. I have shown these bearings as supported from the bars 82. The shaft 140 is adapted to rock in its bearings but it does not rock except when the machine is to be stopped. Carried by the shaft 149 is a trip lever 151 having laterally extending tappets 152. This trip lever and its tappets are particularly shown in Fig. 28. When the trip lever is depressed the shaft 149 is rocked and through the medium of mechanism connected with the shaft the machine is stopped.

153 are arms mounted loosely on the shaft 149. These arms are rigidly connected together so that they will move in unison upon the shaft 149. A convenient way to connect them is that shown in the drawings where 154 is a tube or pipe loosely inclosing the shaft 149 and the arms 153 are secured rigidly to the tube or pipe.

155 is a rod mounted loosely on the ends of the arms 153.

156 are fingers rigidly secured to the rod 155 and passing downward toward the surface of the conveyer. I prefer to arrange one of these fingers between each pair of adjacent disks of the feeding rollers as shown and to bring the lower ends of the fingers near to the stop fingers 133 so that the fingers 156 will act on the extreme forward edges of the sheets.

157 is a collar secured to an end of the rod 155 to which is pivoted a connecting rod 159 as by the lugs 158. The lower end of the rod 159 is pivoted to a pedestal 160. The joints of the two ends of the rod 159 are turned at right angles to one another so as to form a universal joint between the pedestal 160 and the collar 157 by the combination of the two joints. A stem 161 having a shoulder 162 projects from the pedestal 160 and passes through a swivel 163 the stem of which is socketed in the end of an arm 164 loosely mounted on the shaft 108. The stem 161 is free to move in the swivel 163 and normally rests with its shoulder supported by it. It is convenient to pass the arm 164 through the side frame 1 so as to have the connection between the arm 164 to the arm 153 on the inside of the frame.

165 is a cam secured to shaft 114 and adapted to operate on the arm 164 and may operate the arm through the medium of a frictional roller 166. The cam 165 lifts the arm 164 which returns downward by its own weight and the weight of the parts connected to it. The cam 165 is of such shape as to cause the arm 164 and connected parts to descend and then immediately to return to their highest positions and there normally to remain. The swivel 163 and the universal joint described are required because the arm 164 and the arms 153 move in planes at right angles to one another.

The dotted lines 164$^a$ and 164$^b$ in Fig. 16 show the position occupied by the center of the arm 164 when in its extreme upper and extreme lower positions.

When the arm 164 and connected parts are in their normal or elevated position indicated by line 164$^a$ the fingers 156 are raised away from the conveyer, and the sheets may pass under the fingers. When the arm 164 falls the fingers descend upon the conveyer. If a sheet be present under the fingers when they descend the fingers rest upon the sheet and are thereby prevented from farther descent. The parts as shown in full lines in Fig. 16 are in the position which they occupy when the fingers rest upon the sheet, but the arm 164 may continue to descend to the position indicated by dotted line 164$^b$, its swivel 163 sliding downward upon the stem 161. When the arm 164 rises the swivel 163 engages the shoulder 162 of the stem 161 and through the connecting parts described lifts the fingers 156 above the conveyer. The movements described are repeated so long as a sheet is found under the fingers when they descend. When the fingers 156 rest upon a sheet upon the conveyer the under side of one of the arms 153 just touches one of the tappets 152 of the trip lever 151 but does not depress the tappet. Should there be no sheet upon the conveyer to sustain the fingers when they descend the fingers drop below the surface of the conveyer into the position shown by dotted lines 156$^a$ in Fig. 1, and during such descent the shoulders 162 rest against the swivel 163 during the complete descent of the arm 164. When the fingers 156 thus descend below the surface of the conveyer the under side of an arm 153 in its descent depresses the trip lever 151 by contact with one of its tappets 152 and thereby rocks the shaft 149. It will be observed that the fingers 156 rise and fall in a nearly vertical plane and do not oscillate about the shaft 149. This effect is due to the fact that the rod 155 is carried loosely in the ends of the arms 153 and turns in its bearings in those arms, being controlled by the vertically moving connecting rod 159. I prefer to arrange the cams which operate the side registering devices, the front stop fingers and the stop motion fingers in such relations that the stop motion fingers shall descend the instant that the registration of the sheet is completed and before the front stop fingers rise to allow the passage of the sheet forward.

If the stop motion described be not required under any conditions of feeding I provide means for permanently maintaining the fingers 156 in an elevated position.

167, Figs. 2, 13, 16 and 17 is a shoe piece secured to side frame 1.

168 is a bolt adapted to slide in the shoe piece 167. The bolt may be held in position on one side by the face of the shoe piece and on the other side by the side of the frame 1 when a shoe piece is used, such as shown, which has no back to it. A pin 169 may be secured to bolt 168 to serve as a handle by which to move the bolt and the pin may pass through a slot in the face of the shoe piece.

The shoe piece 167 is provided with a vertical socket 170 and an offset or slanting socket 171. The two sockets merge into one socket at the top and each is adapted to receive the bolt 168. The bottom of socket 171 is lower than the bottom of socket 170. By operating the pin 169 the bolt 168 may be placed in either of the sockets. The bolt 168 is of such a length that when it rests in the lower socket 171 its upper end just reaches the upper end of the shoe piece as shown by full lines in Fig. 13; but when the bolt is placed in socket 170 the top of the bolt reaches some distance above the shoe piece 167 as shown by dotted lines 168ª in Fig. 13. The shoe piece is so placed upon the machine that its upper end rests just below the arm 164 when that arm is in its lowermost position, so that the bolt 168, when in the socket 171, will present no obstruction to the movement of the arm 164; but if the bolt be moved into the socket 170 the upper end of the bolt, assuming the position shown in dotted lines 168ª will lift the arm 164 above its normal upper position, and will there retain it. The arm 164 when thus elevated will hold the fingers 156 in an elevated position and the cam 165 turns without operating it.

Mounted loosely on the shaft 149 adjacent to the trip lever 151 is an arm 172 provided with a heel piece 173 adapted to engage one of the tappets 152.

174 is a bar pivoted at one end to the outer end of arm 172 and having its other end extended rearward to and over the sheet holder. The rear end of the bar 174 may be guided in its movements by passing through a slot formed in a standard 175. A spring 176 may connect the rear end of bar 174 to the side frame 1, or to one of the track rails 33, as shown. The spring tends to draw the bar 174 normally rearward to its normal position, in which position the heel 173 of the arm 172 rests upon a tappet 152 of the trip lever 151 but does not depress the tappet. A pin 177 through bar 174 may limit its rearward movement by contact with the standard 175. A downward extension 178 from the rear end of bar 174 reaches to and rests upon the track 33. A foot 179 may be formed on the lower end of the downward extension adapted to rest upon the track. This foot is adapted to slide to and fro on the track and, through the medium of the downward extension 178, to support the rear end of the bar 174.

As the sheets from the pack in the holder are successively withdrawn the pressers in the rear of the pack gradually approach the front of the holder, the friction rollers 32 on the rod 30 of the top pressers rolling down the track 33. When the pack of sheets has become reduced to a certain extent by the withdrawal of sheets one of the rollers 32 on its track 33 strikes the downward extension 178 which rests upon the track 33 in the pathway of the roller. As the thickness of the pack is further reduced by the withdrawal of more sheets the pressers continue to advance toward the front of the holder, and the roller 32 by pushing forward the downward extension 178 and the bar 174 rocks the arm 172 and causes the heel piece 173 to depress the tappet 152 and rock the trip lever 151 and the shaft 149, until the mechanism which stops the machine is put into operation and the machine is stopped.

When the top pressers are removed the spring 176 returns the bar 174 and connected parts to their normal position.

When it is not required to have the stop motion last described operate to stop the machine the bar 174 may be lifted up away from the track 33 and maintained in a raised position by placing the stop pin 177 in a recess formed for that purpose in the standard 175. The bar and attached parts will then occupy the position shown in Fig. 3, and the roller 32 may pass under the bar without operating it in which event the shoes in the holder may be entirely removed by the withdrawing device.

I will now describe the mechanism which is set in operation by the rocking of the shaft 149 to stop the machine.

180 is an arm secured to the shaft 149.

181 is a rod connecting the arm 180 to the horizontal arm 183 of the latch lever 182 which is pivoted to the side of the frame 1.

185 is a bell crank lever pivoted to side frame 1. The horizontal arm 186 of the bell crank lever is adapted to engage with the vertical arm 184 of the latch lever 182 and may engage the latch through the medium of a frictional roller 188 pivoted to the arm 186 and normally resting in a socket in the end of the arm 184. To the end of the other arm 187 of the bell crank lever 185 is pivoted a rod 189 which connects the bell crank lever with the belt shifter, clutch or other stopping device. The rod 189 is connected to the side frame 1 by a spring 190 which tends to draw the rod rearward and to rock the bell crank lever into the position shown in Fig. 12. If preferred the spring 190 may be connected to the arm 187.

When the machine is running all the parts are in the position shown in Fig. 3, and the spring 190 is prevented from drawing the rod 189 rearward because the rod is held forward by the bell crank lever 185 which is maintained in position by its engagement with the latch lever 182.

When the shaft 149 is rocked by the operation of the devices described, or of either of them, the outer end of the arm 180 and the rod 181 are lifted, and the latch lever 182 is caused to rock on its pivot and in so rocking is disengaged from the bell crank lever 185. A very small force exerted on the latch lever 182 will disengage it from the bell crank lever because the frictional roller 188 slips easily out of its socket. When the latch lever 182 is disengaged from the bell crank lever 185 that lever is free to rock and the spring 190 rocks it and retracts the rod 189 operating the stop motion device thereby. When the machine is thus stopped the parts assume the position shown in Fig. 12. When the rod 189 is drawn forward to permit the machine to be started again, the bell crank lever 185 is rocked and is engaged by the latch lever 182 which is moved into engagement by the weight of the rod 181 and connected arms as soon as the devices which rocked the shaft 149 are restored to their normal position.

I have not shown the motion stopping devices connected with the rod 189 as these may be any of the now well known stopping appliances. These devices may operate upon the driving devices of the machine to which the sheet feeding machine is applied so that upon the stopping of that machine the sheet separating and feeding machine which is driven by it will also stop.

If desired, the motion stopping devices may act directly upon the driving devices of the sheet separating and feeding machine, as upon the driving shaft 191.

*The driving mechanism.*—191 is the main driving shaft supported by suitable bearings carried by the side frames 1, 1, and receives power in any suitable manner either from the machine which is being supplied with sheets or from any other suitable source.

The shaft 71, previously mentioned, may be termed the power distributing or counter driving shaft, and may receive power from the shaft 191, as through the gears 192, 193 on the counter and main shafts respectively and the intermediate gear 194. By substituting gears 193 of different sizes the speed of the counter shaft as related to the speed of the main driving shaft may be varied.

The side counter shaft 114 may be driven from the counter shaft 71 by a pair of miter bevel gears 195 so that the shaft 114 turns in unison with the shaft 71.

The withdrawing drum may be driven from a gear 196 on the counter shaft gearing with a gear 197 on the shaft 47 of the withdrawing drum.

The sheet individualizing and initial sheet withdrawing cylinder 48 and the frictional withdrawing roller 58 are shown driven by a gear 198 on the shaft 47 of the withdrawing drum gearing into gears 199 and 200 on the journals of the cylinder 48 and of the roller 58 respectively. The gear 199 is proportioned to the gear 198 as the gear 196 is proportioned to the gear 197, in order that the sheet individualizing and initial sheet withdrawing cylinder and the counter shaft may turn in unison for the purpose hereinbefore stated.

The rear roller of the conveyer is driven from a gear 201 on the counter shaft gearing into a gear 202 on the journal of the conveyer roller.

All of the rollers of the conveyer except the rearmost one are driven from a gear 203 on the journal of the rearmost roller transmitting power through a series of gears 205 on the journals of the conveyer roller; the power being transmitted from one roller to another from the rearmost roller forward through the successive intermediate gears 204

The bottom feeding roller of the final spacing out and separating device is driven from the main driving shaft through the medium of gearing and connecting shafts. 206 is a side shaft supported by bearings carried by the inside of the side frame 1 and is driven by bevel gears 207 from the main driving shaft 191. 208 is a short shaft supported by a suitable bearing carried by a side frame 1 and is driven by bevel gears 209 from the shaft 206. The bottom feeding roller is driven from a gear 210 on the shaft 208 transmitting power to the gear 211 on the shaft of the lower feeding roller through the medium of the intermediate gear 212. By changing the size of the gear 211 the speed of the feeding rollers may be varied. The top feeding roller is driven from a gear 213 on shaft of the bottom feeding roller gearing into a similar gear 214 on the shaft of the top feeding roller.

By the method of driving described the reciprocating parts of the sheet withdrawing, the registering, the spacing out and the stop motion devices each make one and but one complete movement with each sheet fed. When the speed of the counter shaft is varied all the reciprocating movements vary correspondingly. It is by varying the speed of the counter shaft that the machine is adjusted to feed sheets of different lengths, moving slow for long and fast for short sheets; but the feeding rollers of the final spacing out and separating device do not partake of these changes of speed with the counter shaft as these rolls should run at the same speed for all lengths of sheets in the same manner of feeding, when the speed of the ruling machine is not altered. When my feeding machine is driven directly from a shaft of the ruling machine any change in the speed of the ruling machine changes the speed of the entire feeding machine, correspondingly. The speed of the feeding rolls may be changed to suit different manners of feeding without affecting the speed of the other parts of the machine.

*Operation of the machine*—From the foregoing description of the machine its operation in feeding sheets will be readily understood. A pack of sheets is adjusted in the holding device in proper position relatively to the medial line of the machine to be supplied with sheets and the bottom of the holder is adjusted to the proper height to place the top edges of the sheets in line to be operated on by the individualizing and withdrawing device. The bottom and top pressers are put in place in the rear of the pack and the speeds of the various parts are adjusted to suit the length of sheets and the manner in which they are to be fed. The machine is then started in operation. The sheets are individualized and withdrawn from the pack in the manner already described and are received upon the conveyer.. When the front edge of the free advanced bottom sheet on the conveyer reaches the front stop the sheet is arrested, and the registering device operates to register it. The stop motion fingers then descend and, if a sheet has arrived against the front stop, the fingers rise without causing the machine to stop. The front stop fingers then rise and release the sheet which is seized by the feeding disks and delivered to the mechanism which is to perform a subsequent operation upon it.

It is apparent that many details of construction shown are not material to my invention and may be varied in many ways without departing from it, and that, in adapting my improved feeding mechanism to different purposes, features of the mechanism, not required for such purposes may be omitted. For instance in feeding a printing machine or other machine having intaking grippers the feeding rollers and feed gage plate may be removed and the stop fingers ordinarily pertaining to such machines may be substituted for the stop fingers which I have shown.

Having now described my invention, what I claim as new, and desire to secure by Letters Patent, is—

1. In a machine for feeding sheets from a pack, the combination of a holder adapted to support a pack of sheets upon their edges having a front support consisting of a series of rollers for the pack to lean against and a movable bottom to support the lower edges of the sheets in the pack adjustable in an approximately vertical direction, with means for withdrawing the sheets successively from the front of the pack.

2. In a machine for feeding sheets from a pack, the combination of a holder adapted to support a pack of sheets upon their edges having a front support consisting of a series of alternately arranged slats and rollers for the pack to lean against and a movable bottom to support the lower edges of the sheets in the pack adjustable in an approximately vertical direction, with means for withdrawing the sheets successively from the front of the pack.

3. In a machine for feeding sheets from a pack, the combination of a holder adapted to support a pack of sheets upon their edges having a front support for the pack to lean against and a movable bottom to support the lower edges of the sheets in the pack, guide ways arranged in an approximately vertical direction upon the sides of the holder, guide pieces upon the movable bottom adapted to move over the said guide ways, gear racks adapted to support the movable bottom, means for bracing and guiding said gear racks, gears adapted to operate said gear racks and a shaft to carry said gears, all combined so that upon turning the shaft the movable bottom may be adjusted in an approximately vertical direction, and a device for maintaining the movable bottom in any adjusted position.

4. In a machine for feeding sheets from a pack, the combination of a holder adapted to support a pack of sheets upon their edges having a front support for the pack to lean against and a movable bottom to support the lower edges of the sheets in the pack, guide ways arranged in an approximately vertical direction upon the sides of the holder, guide pieces upon the movable bottom adapted to move over the said guide ways, gear racks adapted to support the movable bottom, means for bracing and guiding said gear racks, gears adapted to operate said gear racks, a shaft to carry said gears, a worm wheel on said shaft, a worm adapted to said worm wheel, a shaft to carry said worm and a hand wheel on the shaft last named, all arranged and combined so that the movable bottom may be adjusted in an approximately vertical direction when the hand wheel is turned and maintained in any adjusted position when the hand wheel is released.

5. In a machine for feeding sheets from a pack, the combination of a holder adapted to support a pack of sheets upon their edges having a front support for a face of the pack to lean against and a bottom movable in respect to said front support for the lower edges of the sheets in the pack to rest upon, with a withdrawing device located adjacent to the top of the front support and adapted to act upon the upper edges of successive sheets and withdraw them from the holder, means to adjust the movable bottom in an approximately vertical direction so as to bring the upper edges of the sheets carried thereby to a proper height to be operated upon by the said withdrawing device and to maintain the movable bottom fixedly in such adjusted position until the bottom shall again require to be adjusted to adapt the holder to packs of sheets of a different length, and a raised edge or guard along the forward edge of the movable bottom moving when the bottom is moved in a plane adjacent and parallel to the face of the front support to retain the lower edges of the foremost sheets in the pack.

6. In a machine for feeding sheets from a pack, the combination with a holder adapted to support a pack of sheets upon their edges in an approximately vertical position having a front support for the face of the pack to lean against and a bottom support for the lower edges of the sheets in the pack to rest upon, of a presser adapted to rest against the rear or back of the pack of sheets and to press the sheets toward the said front support, and means to vary the height of the presser whereby the surface of contact between the presser and the sheets may be changed to suit packs of different lengths.

7. In a machine for feeding sheets from a pack, the combination with a holder adapted to support a pack of sheets upon their edges in an approximately vertical position and having an inclined bottom, of a presser carried by the inclined bottom and adapted to press upon the rear or back of the pack and feed the same forward consisting of a series of sections one of which is adapted to be employed singly and the others adapted to be added to or removed from the said singly employed section to vary the height of the presser whereby the surface of contact between the presser and the sheets may be changed to suit packs of different lengths.

8. In a machine for feeding sheets from a pack, the combination with a holder adapted to support a pack of sheets upon their edges in an approximately vertical position and having an inclined bottom, of a presser carried by the inclined bottom and adapted to press upon the rear or back of the pack of sheets and feed the same forward having a bottom or base section and a series of sections adapted to be successively added upon the bottom section or removed therefrom to vary the height of the presser whereby the surface of contact between the presser and the sheets may be changed to suit packs of different lengths of sheets.

9. In a machine for feeding sheets from a pack, the combination of a sheet holder having an inclined bottom and a front support inclined upwardly and outwardly from the lower edge of the inclined bottom, the said bottom and front support being arranged to hold the pack of sheets with the edges of the sheets resting upon the inclined bottom and with a face of the pack leaning against the front support whereby the sheets in the pack will be supported in an approximately vertical position, means for withdrawing the sheets successively from the upper edge of that face of the pack which leans against the front support, a presser adapted to rest against the rear or back of the pack of sheets adjacent to its upper edge and to press the sheets toward the front support and thereby hold the upper edges of the sheets against the action of the withdrawing device and means independent of the inclined bottom to support the said presser in the rear of the pack and guide it toward the said front support.

10. In a machine for feeding sheets from a pack, the combination of a sheet holder having an inclined bottom and a front support inclined upwardly and outwardly from the lower edge of the inclined bottom, the said bottom and front support being arranged to hold the pack of sheets with the edges of the sheets resting upon the inclined bottom and with a face of the pack leaning against the front support whereby the sheets in the pack will be supported in an approximately vertical position, means for withdrawing the sheets successively from the upper edge of that face of the pack which leans against the front support, two or more pressers adapted to rest against the rear or back of the pack of sheets adjacent to its upper edge and to press the sheets toward the front support and thereby hold the upper edges of the sheets against the action of the withdrawing device, means independent of the inclined bottom to support the said pressers in the rear of the pack and guide them toward the said front support, and means to adjust the said pressers laterally across the holder to adapt them to different widths of sheets or to sheets in different positions.

11. In a machine for feeding sheets from a pack, the combination of a sheet holder having an inclined bottom and a front support inclined upwardly and outwardly from the lower edge of the inclined bottom, the said bottom and front support being arranged to hold the pack of sheets with the edges of the sheets resting upon the inclined bottom and with a face of the pack leaning against the front support whereby the sheets in the pack will be supported in an approximately vertical position, means for withdrawing the sheets successively from the upper edge of that face of the pack which leans against the front support, a rod or bar extending across the holder, a presser suspended from said rod or bar and adapted to rest against the rear or back of the pack of sheets along its upper edge and to press the sheets toward the inclined front and thereby hold the upper edges of the sheets against the action of the withdrawing device, antifriction rollers on each end of said rod or bar, and inclined guideways adapted to support and guide the said antifriction rollers and thereby guide the bar and presser toward the said front support.

12. In a machine for feeding sheets from a pack, a holder adapted to support a pack of sheets on end in a more or less upright position combined with independent movable pressers bearing upon the back of the pack adjacent to the top and bottom of the pack respectively.

13. In a machine for feeding sheets from a pack, the combination of a holder adapted to support a pack of sheets upon their edges in an approximately vertical position having an inclined front and an inclined bottom, a bottom presser supported by the inclined bottom and adapted to press upon the rear or back of the pack of sheets and feed it forward, a top presser supported and guided by means independent of the inclined bottom and adapted to rest against the rear or back of the pack of sheets along its upper edge and to press the sheets toward the inclined front, and means for withdrawing the sheets successively from the upper front edge of the holder.

14. In a machine for feeding sheets from a pack, the combination of a holder adapted to support a pack of sheets upon their edges in an approximately vertical position having an inclined front support for the pack to lean against and a movable inclined bottom to support the lower edges of the sheets in the pack adjustable in an approximately vertical direction, a bottom presser supported by the inclined bottom and adapted to press upon the rear or back of the pack of sheets and feed it forward, a top presser supported and guided by means independent of the inclined bottom and adapted to rest against the rear or back of the pack of sheets along its upper edge and to press the sheets toward the inclined front, means to vary the height of the bottom presser to adapt that presser to the varying vertical space between the top presser and the inclined bottom when the bottom is adjusted and means for withdrawing the sheets successively from the upper front edge of the holder.

15. In a machine for feeding sheets from a pack, the combination of a holder adapted to support a pack of sheets upon their edges in an approximately vertical position provided with an inclined bottom, one or more pressers resting upon the inclined bottom and adapted to press upon and force the sheets downward thereon each presser being provided with a hook or hooks, and a ledge formed along the rear edge of the inclined bottom adapted to receive the hooks upon the pressers and thereby support the pressers in a hanging position when they are turned over away from the bottom.

16. In a machine for feeding sheets from a pack, the combination of a holder adapted to support a pack of sheets upon their edges in an approximately vertical position having an inclined front and an inclined bottom, a presser adapted to rest against the rear or back of the pack of sheets adjacent to its upper edge and to press the sheets toward the inclined front, means independent of the inclined bottom to support the said presser in the rear of the pack and guide it toward the front of the holder, means for withdrawing the sheets successively from the upper front edge of the holder, and a holding device to support the presser out of line with the pack of sheets when the presser is not required to press upon the pack.

17. In a machine for feeding sheets from a pack, the combination of a holder adapted to support a pack of sheets upon their edges in an approximately vertical position having an inclined front and an inclined bottom, a rod or bar extending across the holder, a presser suspended from said rod or bar and adapted to rest against the rear or back of the pack of sheets along its upper edge and to press the sheets toward the inclined front, antifriction rollers on each end of said rod or bar, inclined guide ways adapted to support and guide the said antifriction rollers and thereby guide the bar and presser toward the front of the holder, means for withdrawing the sheets successively from the upper front edge of the holder, rearward extensions to said guide ways, and a support adapted to sustain the free end of the presser when its bar is moved back upon the extensions of the guideways whereby the presser may be supported out of line with the pack of sheets when the presser is not required to press upon the pack.

18. In a machine for feeding sheets from a pack, the combination of a sheet holder having an inclined bottom and a front support inclined upwardly and outwardly from the lower edge of the inclined bottom, the said bottom and front support being arranged to hold the pack of sheets with the edges of the sheets resting upon the inclined bottom and with a face of the pack leaning against the front support whereby the sheets in the pack will be supported in an approximately vertical position, means for withdrawing the sheets successively from the upper edge of that face of the pack which leans against the front support, a presser adapted to rest against the rear or back of the pack of sheets adjacent to its upper edge and to press the sheets toward the front support and thereby hold the upper edges of the sheets against the action of the withdrawing device, that portion of said presser which rests against the pack being tapering or wedge shaped in cross section so that it may be drawn upward out of the pack after sheets have been supplied in the rear of and overlying it, and means independent of the inclined bottom to support the said presser in the rear of the pack and guide it toward the said front support.

19. In a machine for feeding sheets from a pack, the combination of a holder adapted to support a pack of sheets upon their edges having front and bottom supports for the pack, a series of grooves 27 upon the upper surface of said bottom support, a base piece 39 having a tongue 40 extending longitudinally on its bottom and adapted to said grooves 27, a top slide 41 adapted to slide transversely across said base piece and having a guiding edge or strip 45, and devices for clamping the top slide to said base piece, all operating substantially as described to adjust the sheets to different positions in the holder.

20. In a machine for feeding sheets from a pack, the combination of a support for a pack of sheets, a series of fingers arranged along an edge of the outermost sheet and adapted to bind that edge against other sheets in the pack, a roller mounted adjacent to the edge of the pack of sheets opposite said fingers and having a rotary motion and also a vibrating movement to and from the edge of the pack, frictional ridges carried by said roller adapted to pass between said fingers when the roller vibrates toward the pack and to press upon the pack near its edge and then by the rotation of the roller to draw the edge of the outermost sheet from under said fingers and thereby individualize the outermost sheet from other sheets in the pack, and a removing device to operate upon the individualized sheet and remove it from the pack.

21. In a machine for feeding sheets successively from a pack, a support for a pack of sheets in combination with a rotating edge bending device adapted to bend outward an edge of the outermost sheet in the pack, arranged to move in a circular path adjacent to and partly overlying the edge of the pack of sheets in such manner that the edge of a sheet as it is bent outward must pass through a part of the space inclosed by the said circular path, rotating in a direction inward from the edge toward the body of the pack when moving over that part of the circular path adjacent to the pack, and constructed to leave unoccupied a portion of the space within the inclosure of the circular path with a free opening from said space outward through said path so that the edge of the sheet as it is bent outward may pass freely through the said unoccupied portion of space, an individualizing device operating in conjunction with said edge bending device and adapted to act upon the outermost sheet and separate an edge of that sheet from other sheets in the pack and place that edge in position to be operated upon by the edge bending device, and devices for seizing upon the edge of the sheet after it is bent out and withdrawing the sheet from the pack.

22. In a machine for feeding sheets successively from a pack, a support for a pack of sheets in combination with a rotating cylinder or roller arranged adjacent to and partly overlying the edge of the pack of sheets so as to intercept the curved path traversed by the edge of a sheet when it is bent outward, rotating in a direction inward from the edge toward the body of the pack on the side adjacent to the sheets, and constructed with a body piece cut away on one side to form a space through which the edge of the sheet as it is bent outward may freely pass, an individualizing device carried in part by said cylinder and adapted to act upon the outermost sheet and separate an edge of that sheet from other sheets in the pack and place that edge in a position to be operated on by the edge bending means, means carried by said cylinder to bend the edge of the sheet outward from the pack, and devices for seizing upon the edge of the sheet after it is bent outward and withdrawing the sheet from the pack.

23. In a machine for feeding sheets successively from a pack, the combination of a support for a pack of sheets, a withdrawing drum mounted adjacent to said support adapted by frictional contact to seize upon the surface of a sheet when the sheet is pressed against it, a cylinder or roller mounted adjacent to and partly overlying the edge of the pack of sheets having a rotary motion and having a body piece cut away on one side to admit of the passing of the separated edge of the sheet through that part of the cylinder when it is bent outward, an individualizing device carried in part by the said cylinder and adapted to act upon the outermost sheet and separate an edge of that sheet from other sheets in the pack, a series of fingers carried by the body piece and rotating with it and adapted to pass behind the separated edge of the sheet and to bend that edge about the withdrawing drum, a frictional pad carried by said body piece adapted to press the bent edge of the sheet against the surface of the drum and thereby cause the sheet to be partially withdrawn from the pack, and a device adapted to seize the advanced edge of the partially withdrawn sheet and to complete the withdrawal of it from the pack.

24. In a machine for feeding sheets successively from a pack, the combination of a support for a pack of sheets, a series of fingers arranged adjacent to an edge of the outermost sheet and adapted to bind that edge against other sheets in the pack, a withdrawing drum mounted adjacent to the holder adapted by frictional contact to seize upon the surface of a sheet when the sheet is pressed against it, a cylinder or roller mounted adjacent to the edge of the pack of sheets opposite said fingers and having a rotary motion and also a vibratory movement to and from the edge of the pack and having a body piece cut away on one side to admit of the passing of the edge of a sheet through that part of the cylinder when it is bent outward from the pack, frictional ridges carried by said body piece adapted to pass between said fingers when the roller vibrates toward the pack and to press upon the pack near its edge and then as the cylinder rotates to draw the edge of the outermost sheet from under said fingers and thereby separate the edge of that sheet from other sheets in the pack, a series of fingers carried by said body piece and rotating with it and adapted to pass behind the separated edge of the sheet and to bend that edge about the withdrawing drum, and a frictional pad carried by the body piece adapted on successive rotations of the body piece to press the sheet against the surface of the drum and thereby cause the sheet upon each rotation of the body piece to be partially withdrawn from the pack.

25. In a machine for feeding sheets successively from a pack, the combination of a support for a pack of sheets, a series of fingers arranged adjacent to an edge of the outermost sheet and adapted to bind that edge against other sheets in the pack, a withdrawing drum mounted adjacent to the holder adapted by frictional contact to seize upon the surface of a sheet when the sheet is pressed against it, a cylinder or roller mounted adjacent to the edge of the pack of sheets opposite said fingers and having a rotary motion and also a vibratory movement to and from the edge of the pack and having a body piece cut away on one side to admit of the passing of the edge of a sheet through that part of the cylinder when it is bent outward from the pack, frictional ridges carried by said body piece adapted to pass between said fingers when the roller vibrates toward the pack and to press, upon the pack near its edge and then as the cylinder rotates to draw the edge of the outermost sheet from under said fingers and thereby separate the edge of that sheet from other sheets in the pack, a series of fingers carried by said body piece and rotating with it and adapted to pass behind the separated edge of the sheet and to bend that edge about the withdrawing drum, a frictional pad carried by the body piece adapted to press the bent edge of the sheet against the surface of the drum and thereby cause the sheet to be partially withdrawn from the pack, and a frictional roller adapted to press the partially withdrawn sheet against the said drum and thereby cause the sheet to be completely withdrawn from the pack.

26. In a machine for feeding sheets successively from a pack, the combination of a support for a pack of sheets, a series of fingers arranged adjacent to an edge of the outermost sheet and adapted to bind that edge against other sheets in the pack, a withdrawing drum mounted adjacent to the holder adapted by frictional contact to seize upon the surface of a sheet when the sheet is pressed against it, a cylinder or roller mounted adjacent to the edge of the pack of sheets opposite said fingers and having a rotary motion and also a vibratory movement to and from the edge of the pack and having a body piece cut away on one side to admit of the passing of the edge of a sheet through that part of the cylinder when it is bent outward from the pack, frictional ridges carried by said body piece adapted to pass between said fingers when the roller vibrates toward the pack and to press upon the pack near its edge and then as the cylinder rotates to draw the edge of the outermost sheet from under said fingers and thereby separate the edge of that sheet from other sheets in the pack, a series of fingers carried by said body piece and rotating with it and adapted to pass behind the separated edge of the sheet and to bend that edge about the withdrawing drum, a frictional pad carried by the body piece adapted to press the bent edge of the sheet against the surface of the drum and thereby cause the sheet to be partially withdrawn from the pack, a frictional roller adapted to press the partially withdrawn sheet against the said drum and thereby cause the sheet to be completely withdrawn from the pack, and a conveyer arranged to receive the withdrawn sheets.

27. In a machine for feeding sheets successively from a pack, the combination of a holder adapted to support a pack of sheets upon their edges in an approximately vertical position, a series of fingers arranged adjacent to an edge of the outermost sheet and adapted to bind that edge against other sheets in the pack, a withdrawing drum mounted adjacent to the pack adapted by frictional contact to seize upon the surface of a sheet when the sheet is pressed against it, a rotating cylinder mounted adjacent to the edge of the pack of sheets opposite said fingers and having a body piece cut away on one side, a frictional pad carried by said body piece, ridges forming part of said pad, a series of fingers carried by the body piece and rotating with it, a rocking frame to support said cylinder mounted in such manner that when the frame rocks the said cylinder will be caused to vibrate to and from the edge of the pack and over a section of the periphery of the withdrawing drum, and cam devices to rock said frame, all combined and operating substantially as and for the purpose described.

28. In a machine for feeding sheets successively from a pack, the combination of a holder adapted to support a pack of sheets upon their edges in an approximately vertical position, a series of fingers arranged adjacent to an edge of the outermost sheet and adapted to bind that edge against other sheets in the pack, a withdrawing drum mounted adjacent to the pack adapted by frictional contact to seize upon the surface of a sheet when the sheet is pressed against it, a rotating cylinder mounted adjacent to the edge of the pack of sheets opposite said fingers and having a body piece cut away on one side, a frictional pad carried by said body piece, ridges forming part of said pad, a series of fingers carried by the body piece and rotating with it, a rocking frame to support said cylinder mounted in such manner that when the frame rocks the said cylinder will be caused to vibrate to and from the edge of the pack and over a section of the periphery of the withdrawing drum, cam devices to rock said frame and a frictional pressure roller also carried by said frame, all combined and operating substantially as and for the purpose described.

29. In a machine for feeding sheets successively from a pack, the combination of a holder adapted to support a pack of sheets upon their edges in an approximately vertical position, a series of fingers arranged adjacent to an edge of the outermost sheet and adapted to bind that edge against other sheets in the pack, a withdrawing drum mounted adjacent to the pack adapted by frictional contact to seize upon the surface of a sheet when the sheet is pressed against it, a rotating cylinder mounted adjacent to the edge of the pack of sheets opposite said fingers and having a body piece cut away on one side, a frictional pad carried by said body piece, ridges forming part of said pad, a series of fingers carried by the body piece and rotating with it, a rocking frame to support said cylinder mounted in such manner that when the frame rocks the said cylinder will be caused to vibrate to and from the edge of the pack and over a section of the periphery of the withdrawing drum, cam devices to rock said frame, and an adjustable stop to limit the movement of said cylinder when it vibrates toward the edge of the pack, all combined and operating substantially as and for the purpose described.

30. In a machine for feeding sheets successively from a pack, the combination of a holder adapted to support a pack of sheets upon their edges in an approximately vertical position, a series of fingers arranged adjacent to an edge of the outermost sheet and adapted to bind that edge against other sheets in the pack, a withdrawing drum mounted adjacent to the pack adapted by frictional contact to seize upon the surface of a sheet when the sheet is pressed against it, a rotating cylinder mounted adjacent to the edge of the pack of sheets opposite said fingers and having a body piece cut away on one side, a frictional pad carried by said body piece, ridges forming part of said pad, a series of fingers carried by the said body piece and rotating with it, a rocking frame to support said cylinder mounted in such manner that when the frame rocks the said cylinder will be caused to vibrate to and from the edge of the pack and over a section of the periphery of the withdrawing drum, bearings for said cylinder, guide ways in said rocking frame adapted to support and guide said bearings, springs carried by said rocking frame and adapted to press on the said bearings and force said cylinder against the withdrawing drum, adjustable stops to limit the movement of said bearings when they are pressed upon by said springs, and cam devices to rock said frame, all combined and operating substantially as and for the purpose described.

31. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, side stops to determine the side alignment of the sheets and a series of movable frictional pads arranged between the conveying rollers and adapted to engage the under side of a sheet which has been arrested by the stop fingers and to draw the sheet laterally against the side stops.

32. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, fixed supports for the passing sheets arranged between said rollers, a series of openings in said supports, stop fingers adapted to engage the front edges of the sheets successively as they pass upon the conveyer to arrest the sheets from their forward movement, side stops to determine the side alignment of the sheets and a series of movable frictional pads arranged between the conveying rollers and adapted to pass through the openings in said supports to engage the under side of a sheet which has been arrested by the stop fingers and to draw the sheet laterally against the side stops.

33. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, side stops to determine the side alignment of the sheets, a series of bars arranged between adjacent conveying rollers, a series of frictional pads carried by each of said bars adapted to engage the under side of a sheet which has been arrested by the stop fingers and means to move said bars so as to cause the said pads to engage the sheet and draw it laterally against the side stops.

34. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, side stops to determine the side alignment of the sheets, a series of bars arranged between adjacent conveying rollers, a series of frictional pads carried by each of said bars, devices to reciprocate each of said bars longitudinally, and devices controlled by the longitudinal reciprocation of said bars to cause them to reciprocate vertically, all of the devices which move the said bar being combined and operated to cause the said frictional pads to rise and engage the under side of a sheet which has been arrested by the stop fingers and to draw the sheet laterally against the side stops, and then to descend and return to a position to engage the succeeding sheet.

35. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, side stops to determine the side alignment of the sheets, a series of bars 92 arranged between adjacent conveying rollers, a series of frictional pads carried by each of said bars, means to reciprocate each of said bars longitudinally, the bars 94 located below the bars 92, the bars 92 and 94 being provided with opposite inclined faces 103 and 104, the spring pawl 99 adjacent to the bar 94 and adapted to engage said bar and lock it against movement, the pin 102 on the bar 92 adapted to strike the spring pawl 99 and operate it to release the bar 94, stops 106 and 107, on the bars 92 and 94 respectively, and the spring 105 between the bars 92 and 94 all combined and operating substantially as and for the purpose described.

36. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, side stops to determine the side alignment of the sheets, a series of bars arranged between adjacent conveying rollers, a series of frictional pads carried by each of said bars, devices to reciprocate said bars longitudinally consisting of the rock shaft 108, bell crank levers 110 carried by the rock shaft 108 having arms 111 and 116, rod 112 carried by the arms 111, links 113 between the rod 112 and the longitudinally movable bars, cams for operating the arms 116 and devices controlled by the longitudinal reciprocation of said bars to impart a vertical reciprocation to them, all combined and operating substantially as and for the purpose described.

37. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, side stops to determine the side alignment of the sheets, a series of bars arranged between adjacent conveying rollers, a series of frictional pads carried by each of said bars, devices to reciprocate each of said bars longitudinally, and devices controlled by the longitudinal reciprocation of said bars to cause them to reciprocate vertically, all of the devices which move the said bar being combined and operated to cause the said frictional pads to rise and engage the under side of a sheet which has been arrested by the stop fingers and to draw the sheet laterally against the side stops, and then to descend and return to a position to engage the succeeding sheet, and means for disconnecting said bars from the devices that reciprocate them longitudinally whereby one or more of said bars may be thrown out of operation without interfering with the operation of the remaining bars.

38. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, side stops to determine the side alignment of the sheets, a series of bars arranged between adjacent conveying rollers, a series of frictional pads carried by each of said bars, the vibrating rod 112, thimbles 119 on said rod, links 113 connecting said rod to said bars and having eyes adapted to pass over said thimbles with an opening 121 through each eye to permit the links to be disconnected from the rod 112 when the thimbles are withdrawn from the eyes, means to detachably fasten said thimbles to said rod and devices to impart a vertical reciprocation to said bars, all combined and operating substantially as described to register the sheet which has been arrested by the stop fingers against the side stops and to permit any of said reciprocating bars to be put out of operation.

39. In a machine for feeding sheets successively from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, bars 81 arranged between certain pairs of adjacent rollers in said series of rollers, shoe pieces 83 adapted to slide on said bars, tie rod 84 connecting said shoe pieces, means for clamping said shoe pieces on to said bars 81, fingers 87 secured to rod 84, and a device to engage the surface of a sheet which has been arrested by the stop fingers and to draw the sheet laterally against the fingers 87.

40. In a machine for feeding sheets from a pack, the combination of a support for a pack of sheets, a device for withdrawing the sheets successively from the pack, rotary frictional conveying rollers arranged transversely across the machine in a series extending forward from the withdrawing device and adapted to receive the sheets from the withdrawing device and convey them therefrom, stop fingers adapted to engage the front edges of the sheets successively as they pass upon the conveyer to arrest the sheets in their forward movement, side gage fingers having their lower ends projecting below the surface of the sheets passing upon the conveyer into the longitudinal spaces between adjacent rollers of the series of rollers constituting the conveyer, means to support said gage fingers and to adjust them transversely across the machine, and a device to engage the surface of a sheet which has been arrested by the stop fingers and to draw the sheets laterally against the fingers in whatever position the said fingers may happen to be adjusted across the machine.

41. In a machine for feeding sheets successively from a pack, the combination of a support for a pack of sheets, a device for withdrawing the sheets successively from the pack, a conveyer to receive the sheets from the withdrawing device and convey them therefrom, lower and upper feeding disks adapted to seize the sheets that are carried forward by the conveyer and to deliver them to such devices as are to further operate upon them, shoulders formed between the lower feeding disks of a less diameter than the diameter of the disks vertically vibrating stop fingers adapted to descend on that side of the intaking line between the lower and upper feeding disks on which the sheets approach the disks and to rest upon said shoulders so that the points of the fingers will extend below the surface of a sheet when the edge of the sheet is in contact with the surface of the disks, a rocker bar to support and control the stop fingers, and cam devices for intermittently rocking said rocker bar all combined and operating as and for the purpose described.

42. In a machine for feeding sheets successively from a pack, the combination of a support for a pack of sheets, a device for withdrawing the sheets successively from the pack, a conveyer to receive the sheets from the withdrawing device and convey them therefrom, lower and upper feeding disks adapted to seize the sheets that are carried forward by the conveyer and to deliver them to such devices as are to further operate upon them, a sheet guide to direct the sheets as they pass from between the feeding disks pivoted upon a fixed transverse axis whereby it may be rocked or oscillated, a device to oscillate the said sheet guide about the said fixed axis so as to adjust the guide to different angles relatively to the direction in which the sheets are moving, and means to secure the guide in any adjusted position.

43. In a machine for feeding sheets successively from a pack, the combination of a support for a pack of sheets, a device for withdrawing the sheets successively from the pack, a conveyer to receive the sheets from the withdrawing device and convey them therefrom, lower and upper feeding disks adapted to seize the sheets that are carried forward by the conveyer and to deliver them to such devices as are to further operate upon them, a sheet guide to direct the sheets as they pass from between the feeding disks having projecting parts adapted to pass between the lower feeding disks to direct the sheets upon the guide, a bar to support the said guide, an arm attached to said bar adapted to rock the bar and thereby adjust the sheet guide to different angles, and means to clamp said arm in any adjusted position.

44. In a machine for feeding sheets successively from a pack, the combination of a support for a pack of sheets, devices for withdrawing the sheets successively from the pack, a conveyer to receive the sheets from the withdrawing device and convey them therefrom, feeding disks adapted to seize the sheets that are carried forward by the conveyer and to deliver them to such devices as are to further operate upon them, a series of fingers adapted to reciprocate to and from the surface of the conveyer with their ends between the said feeding disks so that the ends of the fingers may operate in a plane located within the circumferences of said disks on that side of the intaking line of the disks toward the conveyer, means to reciprocate said fingers, stopping devices for stopping the operation of the machine, and connecting devices between the fingers and stopping devices, all combined and operating to stop the operation of the machine whenever the ends of the reciprocating fingers pass below the plane in which the sheets travel in passing between the feeding disks.

45. In a machine for feeding sheets successively from a pack, the combination of a support for a pack of sheets, devices for withdrawing the sheets successively from the pack, a conveyer to receive the sheets from the withdrawing device and convey them therefrom, a shaft arranged across the conveyer, horizontal arms rigidly connected carried by said shaft, a rod mounted loosely in the outer ends of said arms, a series of fingers carried by the said rod, cam devices for giving a vertical vibratory movement to said rod, the said shaft, arms, rod, fingers and cam devices being combined and operated so as to cause said fingers to move in an approximately vertical plane to and from the surface of the conveyer, stopping devices for stopping the operation of the machine, a connection between the stopping devices and the said shaft, and a connection between said shaft and said horizontal arms, all combined and operating to stop the machine whenever a sheet is not present upon the conveyer under the fingers when they descend.

46. In a machine for feeding sheets successively from a pack, the combination of a support for a pack of sheets, a device for withdrawing the sheets successively from the pack, a conveyer to receive the sheets from the withdrawing device and convey them therefrom, a series of fingers adapted to move to and from the surface of the conveyer, vibrating arm 164, a cam to vibrate said arm, a connection between said arm and the said fingers to communicate motion from the arm to the fingers, stopping devices for stopping the operation of the machine, and connecting devices between said fingers and stopping devices, all combined and operating to stop the operation of the machine whenever a sheet is not present upon the conveyer under the fingers when they move toward it, and a device to maintain the arm 164 in a permanently raised position out of line with the movements of the said cam whereby the stopping devices may be thrown out of operation whenever these devices are not required to act.

47. In a machine for feeding sheets successively from a pack, the combination of a support for a pack of sheets, a device for withdrawing the sheets successively from the pack, a conveyer to receive the sheets from the withdrawing device and convey them therefrom, a series of fingers adapted to move to and from the surface of the conveyer, a vibrating arm 164, a cam to vibrate said arm, a connection between said arm and the said fingers to communicate motion from the arm to the fingers, stopping devices for stopping the operation of the machine, and connecting devices between said fingers and stopping devices, all combined and operating to stop the operation of the machine whenever a sheet is not present upon the conveyer under the fingers when they move toward it, and a supporting bolt located adjacent to the arm 164 and adapted to be moved to engage the arm 164 and maintain it out of operative position with reference to the cam whereby the stopping devices may be thrown out of operation whenever these devices are not required to act.

48. In a machine for feeding sheets successively from a pack, the combination of a holder adapted to support a pack of sheets upon their edges in an approximately vertical position and having an inclined front for the pack to lean against, means for withdrawing the sheets successively from the upper front edge of the holder, a presser adapted to rest against the rear or back of the pack of sheets along its upper edge and to press the sheets forward toward the inclined front, means to support the said presser in the rear of the pack and guide it toward the front of the holder, and a stop motion device actuated by the presser as it moves toward the front of the holder to stop the operation of the machine whenever the pack of sheets in the holder becomes to a certain extent reduced by the withdrawal of sheets.

49. In a machine for feeding sheets successively from a pack, the combination of a holder adapted to support a pack of sheets upon their edges in an approximately vertical position and having an inclined front for the pack to lean against, means for withdrawing the sheets successively from the upper front edge of the holder, a presser suspended from a rod or bar and adapted to rest against the rear or back of the pack of sheets along its upper edge and to press the sheets toward the inclined front, a movable rod or bar extending across the holder from which the presser is suspended, inclined guide ways adapted to guide the said rod or bar and the presser suspended therefrom toward the front of the holder, a bar 174 extending rearward over the sheet holder and adapted to be moved to and fro and provided with an extension adjacent to one of said guide ways in a position to be acted upon by said movable rod or bar as it moves down its guide way and be moved thereby, a spring to normally retain the bar in a rearward position, a stopping device for stopping the operation of the machine, and connecting devices between said stopping devices and the bar 174, all combined and operating to stop the operation of the machine whenever the pack of sheets becomes to a certain extent reduced by the withdrawal of sheets.

50. In a machine for feeding sheets successively from a pack, the combination of a holder adapted to support a pack of sheets upon their edges in an approximately vertical position and having an inclined front for the pack to lean against, means for withdrawing the sheets successively from the upper front edge of the holder, a presser suspended from a rod or bar and adapted to rest against the rear or back of the pack of sheets along its upper edge and to press the sheets toward the inclined front, a movable rod or bar extending across the holder from which the presser is suspended, inclined guide ways adapted to guide the said rod or bar and the presser suspended therefrom toward the front of the holder, a bar 174 extending rearward over the sheet holder and adapted to be moved to and fro and provided with an extension adjacent to one of said guide ways in a position to be acted upon by said movable rod or bar as it moves down its guide way and be moved thereby, a spring to normally retain the bar in a rearward position, a stopping device for stopping the operation of the machine, connecting devices between said stopping devices and the bar 174, all combined and operating to stop the operation of the machine whenever the pack of sheets becomes to a certain extent reduced by the withdrawal of sheets, and a device to maintain the rear end of the bar 174 in a permanently raised position with its said extension out of the line with the movement of said presser supporting bar to allow the said bar to pass without operating the stopping devices when these devices are not required to act.

51. In a machine for feeding sheets successively from a pack, the combination of a holder adapted to support a pack of sheets upon their edges in an approximately vertical position and having an inclined front for the pack to lean against, a device for withdrawing the sheets successively from the pack, a conveyer to receive the sheets from the withdrawing device and convey them therefrom, a shaft arranged across the conveyer, a trip lever secured to said shaft, tappets upon said trip lever, horizontal arms rigidly connected mounted loosely on said shaft one of which is adapted to engage a tappet of said trip lever, a rod carried by the outer ends of said arms, fingers attached to said rod and reaching toward the surface of the conveyer, means to oscillate said rod and its supporting arms and to cause the fingers to reciprocate to and from the surface of the conveyer in such a manner that when the fingers in descending rest upon a sheet upon the conveyer one of said arms will approach one of said tappets but without depressing it but when the fingers are not sustained and fall below the surface of the conveyer the arm will depress said tappet and thereby rock said trip lever and shaft, an arm mounted loosely on said shaft adjacent to said trip lever, a heel piece attached to said arm adapted to engage a tappet of said trip lever, a bar pivoted to said arm and extending rearward to the sheet holder, a presser adapted to rest against the rear or back of the pack of sheets and press the sheets toward the front of the holder, devices connected to the rear end of said bar adapted to be engaged by the presser as it moves forward whereby the bar will be moved forward also and through the medium of said arm and heel piece depress said tappet and thereby rock said trip lever and shaft, stopping devices for stopping the operation of the machine and a connection between said stopping devices and said shaft, substantially as and for the purpose described.

52. In a machine for feeding sheets successively from a pack, the combination of a support for a pack of sheets, a device for withdrawing the sheets successively from the pack, a conveyer to receive the sheets from the withdrawing device and convey them therefrom, a shaft arranged across the conveyer, devices for rocking said shaft whenever under certain conditions the machine is to be stopped, an arm secured to said shaft, a latch lever operated by said arm, a latch engaging lever having an arm adapted to engage with said latch lever, a motion arresting device for stopping the operation of the machine, a connection between said motion arresting device and the latch engaging lever, and a spring acting on said connection to normally operate the motion arresting device, all combined and operating substantially as described to stop the operation of the machine whenever the said shaft is rocked by the operation of the devices which control it.

53. In a sheet feeding machine, the combination of a support for a pack of sheets, a roller recessed upon one side arranged adjacent to and partly overlying an edge of the pack of sheets, an individualizing device carried in part by said roller and adapted to act upon the outermost sheet and separate a portion of that sheet from other sheets in the pack, means carried by said roller adapted to act upon the separated portion of the sheet and bend that portion outward from the pack through the recess in the side of the roller, withdrawing devices to seize upon the outwardly bent portion of the sheet and withdraw the sheet from the pack, a conveyer to receive the sheets as they pass from the withdrawing devices, power devices to operate said roller to cause the individualizing device to act upon and individualize a series of sheets and to cause the edge bending means to bend outward a portion of each sheet after it is individualized while sheets previously individualized are in process of withdrawal from the pack, and power devices to operate the said withdrawing devices so that the withdrawing devices can act upon the series of sheets without interfering with the action of the individualizing and edge bending devices all combined and operated so that the sheets will be withdrawn from the pack and placed upon the conveyer in a series lying one upon another with the forward edge of each sheet somewhat advanced beyond the forward edge of the next following sheet.

In testimony of which invention I have hereunto set my hand.

J. HENRY KNOWLES.

Witnesses:
ERNEST HOWARD HUNTER,
C. H. NEWCOMB.